US010669359B2

(12) United States Patent
McDaniel et al.

(10) Patent No.: US 10,669,359 B2
(45) Date of Patent: Jun. 2, 2020

(54) REINFORCEMENT OF A CHROMIUM/SILICA CATALYST WITH SILICATE OLIGOMERS

(71) Applicant: Chevron Phillips Chemical Company LP, The Woodlands, TX (US)

(72) Inventors: Max P. McDaniel, Bartlesville, OK (US); Stephen L. Kelly, Kingwood, TX (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 0 days.

(21) Appl. No.: 16/286,680

(22) Filed: Feb. 27, 2019

(65) Prior Publication Data

US 2019/0256622 A1    Aug. 22, 2019

Related U.S. Application Data

(63) Continuation of application No. 15/899,448, filed on Feb. 20, 2018, now Pat. No. 10,259,893.

(51) Int. Cl.
| | |
|---|---|
| *C08F 10/02* | (2006.01) |
| *B01J 37/02* | (2006.01) |
| *B01J 37/03* | (2006.01) |
| *B01J 35/10* | (2006.01) |
| *B01J 21/08* | (2006.01) |
| *B01J 35/02* | (2006.01) |
| *C08F 110/02* | (2006.01) |
| *C08F 210/16* | (2006.01) |
| *B01J 23/26* | (2006.01) |

(52) U.S. Cl.
CPC .............. *C08F 10/02* (2013.01); *B01J 21/08* (2013.01); *B01J 23/26* (2013.01); *B01J 35/023* (2013.01); *B01J 35/1019* (2013.01); *B01J 35/1047* (2013.01); *B01J 37/0203* (2013.01); *B01J 37/035* (2013.01); *C08F 110/02* (2013.01)

(58) Field of Classification Search
USPC .......................... 502/158, 256, 439; 526/106
See application file for complete search history.

(56) References Cited

U.S. PATENT DOCUMENTS

| | | |
|---|---|---|
| 3,242,099 A | 3/1966 | Manyik et al. |
| 3,248,179 A | 4/1966 | Norwood |
| 4,041,224 A | 8/1977 | Hoff et al. |
| 4,206,297 A | 6/1980 | Hoff et al. |
| 4,301,034 A | 11/1981 | McDaniel |
| 4,339,559 A | 7/1982 | McDaniel |
| 4,345,055 A | 8/1982 | Hawley |
| 4,368,303 A | 1/1983 | McDaniel |
| 4,402,864 A | 9/1983 | McDaniel |
| 4,501,885 A | 2/1985 | Sherk et al. |
| 4,547,557 A | 10/1985 | McDaniel |
| 4,588,790 A | 5/1986 | Jenkins, III et al. |
| 4,794,096 A | 12/1988 | Ewen |
| 4,808,561 A | 2/1989 | Welborn, Jr. |
| 5,352,749 A | 10/1994 | DeChellis et al. |
| 5,436,304 A | 7/1995 | Griffin et al. |
| 5,565,175 A | 10/1996 | Hottovy et al. |
| 5,575,979 A | 11/1996 | Hanson |
| 5,576,259 A | 11/1996 | Hasegawa et al. |
| 5,739,220 A | 4/1998 | Shamshoum et al. |
| 5,807,938 A | 9/1998 | Kaneko et al. |
| 5,919,983 A | 7/1999 | Rosen et al. |
| 6,239,235 B1 | 5/2001 | Hottovy et al. |
| 6,262,191 B1 | 7/2001 | Hottovy et al. |
| 6,489,428 B1 | 12/2002 | Debras et al. |
| 6,833,415 B2 | 12/2004 | Kendrick et al. |
| 7,128,884 B2 | 10/2006 | Kirkland et al. |
| 7,294,599 B2 | 11/2007 | Jensen et al. |
| 7,531,606 B2 | 5/2009 | Hendrickson |
| 7,598,327 B2 | 10/2009 | Shaw |
| 7,601,665 B2 | 10/2009 | McDaniel et al. |
| 7,700,516 B2 | 4/2010 | McDaniel et al. |
| 7,884,163 B2 | 2/2011 | McDaniel et al. |
| 7,906,603 B2 | 3/2011 | McDaniel et al. |
| 8,114,946 B2 | 2/2012 | Yang et al. |
| 8,222,470 B2 | 7/2012 | Coupard et al. |
| 8,309,485 B2 | 11/2012 | Yang et al. |
| 8,822,608 B1 | 9/2014 | Bhandarkar et al. |
| 9,096,699 B2 | 8/2015 | McDaniel et al. |
| 9,365,664 B2 * | 6/2016 | Schmidt ................ C08F 110/02 |
| 10,259,893 B1 | 4/2019 | McDaniel et al. |
| 2004/0059070 A1 | 3/2004 | Whitte et al. |
| 2014/0088274 A1 * | 3/2014 | Ding ................... C08F 4/65904 526/113 |

(Continued)

FOREIGN PATENT DOCUMENTS

WO    2008028815 A1    3/2008

OTHER PUBLICATIONS

International Search Report issued in corresponding application No. PCT/US19/17739 dated Jul. 31, 2019, 2 pages.
Arnett et al., entitled "Zero-Shear Viscosity of Some Ethyl Branched Paraffinic Model Polymers," Journal of Physical Chemistry, 1980, 84(6), pp. 649-652.
Barrett et al entitled "The Determination of Pore Volume and Area Distributions in Porous Substances. I. Computations from Nitrogen Isotherms," J. Am. Chem. Soc., 1951, 73, pp. 373.
Bird et al., entitled "Dynamics of Polymeric Liquids," vol. 1, Fluid Mechanics, 2nd Edition, John Wiley & Sons, 1987, 3 pages.

(Continued)

*Primary Examiner* — Fred M Teskin

(74) *Attorney, Agent, or Firm* — Merchant & Gould P.C.

(57) ABSTRACT

Methods for reinforcing chromium catalysts by the deposition of additional silica are disclosed herein. The resultant silica-reinforced chromium supported catalysts can be used to polymerize olefins to produce, for example, ethylene based homopolymers and copolymers with higher molecular weights and additional long chain branching.

22 Claims, 6 Drawing Sheets

(56) References Cited

U.S. PATENT DOCUMENTS

| | | | |
|---|---|---|---|
| 2014/0163181 A1* | 6/2014 | Yang | C08F 4/6592 526/64 |
| 2014/0275457 A1 | 9/2014 | McDaniel et al. | |
| 2015/0018503 A1 | 1/2015 | McDaniel et al. | |
| 2015/0126692 A1* | 5/2015 | Sukhadia | C08F 210/16 526/64 |
| 2015/0175726 A1* | 6/2015 | McDaniel | C08F 210/14 526/64 |
| 2017/0015764 A1 | 1/2017 | Praetorius et al. | |
| 2017/0080406 A1 | 3/2017 | Praetorius et al. | |

OTHER PUBLICATIONS

Brunauer et al., entitled "Adsorption of Gases in Multimolecular Layers," J. Am Chem. Soc., 1938, 60, pp. 309.

Film Extrusion Manual—Process, Materials, Properties, TAPPI Press, 1992, 16 pages.

Hieber et al., entitled "Shear-Rate-Dependence Modeling of Polymer Melt Viscosity," Polymer Engineering and Science, 1992, 32(14), pp. 931-938.

Hieber et al., entitled "Some correlations involving the shear viscosity of polystyrene melts," Rheologica Acta, 1989, vol. 28, pp. 321-332.

Janzen et al., entitled "Diagnosing long-chain branching in polyethylenes," J. Mol. Struct., 485-486 (1999) 569-584.

Modern Plastics Encyclopedia, Mid-Nov. 1995 Issue, vol. 72, No. 12, 3 pages.

Yu et al., entitled "Long Chain Branches in Metallocene-Catalyzed Polyethylene Determined by a Combination of SEC/Multi-Angle Light Scattering, NMR and Rheology," published in Polymer Preprints, 2003, vol. 44(2), pp. 49-50.

Max P. McDaniel, et al.,"Reinforcement of Cr/silica Catalysts by Secondary Deposition of Silicate Oligomers," Applied Catalysts A: General, Elsevier, Amsterdam, NL, vol. 554, Feb. 3, 2018, pp. 88-94.

International Search Report and Written Opinion issued in corresponding application No. PCT/US19/17739 dated Jul. 31, 2019, 6 pages.

IUPAC Compendium Chemical Termology, 2nd Ed. 1997.

Halsey, et al., "Physical adsorption on non-uniform surfaces," Journal of Chemical Physics, vol. 16, 1948, pp. 931-937.

Paul J. DesLauries, et al., "Short Chain Branching Profiles in Polyethylene From the Phillips Cr/Silica Catalyst", Journal of Polymer Science Part A: Polymer Chemistry, vol. 45, No. 15, Aug. 1, 2007, pp. 3135-3149; XP055124768; ISSN: 0887-624X; DOI: 10.1002/pola.22174.

International Search Report and Written Opinion dated May 10, 2019 in related application No. PCT/US2018/059950, 15 pages.

J. Forsman, et al., "Elasticity of a Percolation System: Silica Smoke," Can. J. Phys. vol. 65, 1987, pp. 767-771.

* cited by examiner

REINFORCEMENT OF A CHROMIUM/SILICA CATALYST WITH SILICATE OLIGOMERS

REFERENCE TO RELATED APPLICATION

This application is a continuation application of U.S. patent application Ser. No. 15/899,448, filed on Feb. 20, 2018, now U.S. Pat. No. 10,259,893, the disclosure of which is incorporated herein by reference in its entirety.

FIELD OF THE INVENTION

The present disclosure generally relates to chromium supported catalysts, methods for preparing the chromium supported catalysts, methods for using the chromium supported catalysts to polymerize olefins, the polymer resins produced using such catalysts, and articles produced using these polymer resins. More particularly, the present disclosure relates to methods for making a silica-reinforced or silica-deposited chromium supported catalyst, and the subsequent use of the silica-reinforced or silica-deposited catalyst to produce polymer resins with different molecular weight, melt flow, and long chain branching properties.

BACKGROUND OF THE INVENTION

Chromium/silica catalysts can be used to make ethylene-based polymers, such as HDPE. However, the ability to manipulate or control the molecular weight, the molecular weight distribution, and the amount of long chain branching of such polymers, based solely on the physical structure of the chromium/silica catalyst, is not fully understood. It would be beneficial to modify certain physical parameters of the catalyst—such as surface area and pore volume—in order to manipulate or control important molecular weight and branching properties of the polymer. Accordingly, it is to this end that the present invention is generally directed.

SUMMARY OF THE INVENTION

This summary is provided to introduce a selection of concepts in a simplified form that are further described below in the detailed description. This summary is not intended to identify required or essential features of the claimed subject matter. Nor is this summary intended to be used to limit the scope of the claimed subject matter.

In one aspect of this invention, a process for reinforcing a chromium supported catalyst is disclosed, and in this aspect, the process can comprise contacting a chromium supported catalyst with a silicon-containing material to deposit at least about 5 wt. % silica on the chromium supported catalyst to form a silica-reinforced chromium supported catalyst. The amount of added silica ($SiO_2$) is based on the total weight of the reinforced catalyst.

In another aspect of this invention, a process for reinforcing a solid support is disclosed, and in this aspect, the process can comprise contacting a solid oxide with a silicon-containing material to deposit at least about 5 wt. % silica on the solid oxide to form a silica-reinforced solid support. The amount of added silica ($SiO_2$) is based on the total weight of the reinforced solid support. Further, a chromium-containing compound can be added during or after the silica addition step, thus resulting in a silica-reinforced chromium supported catalyst.

Silica-reinforced or silica-deposited chromium supported catalysts also are disclosed and described herein. For example, the silica-reinforced or silica-deposited chromium supported catalyst can comprise a solid support, and from about 0.1 to about 15 wt. % chromium, based on the total weight of the reinforced catalyst. The catalyst can be characterized by a total pore volume of at least about 0.8 mL/g, a total BET surface area of at least about 200 $m^2/g$, and a micropore BET surface area (<50 Å) that is from about 10% to about 60% of the total BET surface area.

Silica-reinforced or silica-deposited solid supports also are disclosed and described herein. Such reinforced solid supports can comprise a solid oxide, and the solid support can be characterized by a total pore volume of at least about 0.8 mL/g, a total BET surface area of at least about 200 $m^2/g$, and a micropore BET surface area (<50 Å) that is from about 10% to about 60% of the total BET surface area.

The present invention also contemplates and encompasses olefin polymerization processes. Such processes can comprise contacting a silica-reinforced chromium supported catalyst and an optional co-catalyst with an olefin monomer and an optional olefin comonomer in a polymerization reactor system under polymerization conditions to produce an olefin polymer. Beneficially, the silica-reinforced chromium supported catalysts disclosed herein are capable of producing, or configured to produce, polymers with a higher molecular weight, broader molecular weight distribution, lower melt index, and more long chain branching.

An illustrative example of an ethylene polymer, such as an ethylene homopolymer or an ethylene/α-olefin copolymer, that can be produced with the silica-reinforced chromium support catalyst can be characterized by a melt index from 0 to about 0.5 g/10 min, a ratio of HLMI/MI from about 30 to about 150, a Mw from about 150 to about 350 kg/mol, a ratio of Mw/Mn from about 5 to about 15, and from about 1 to about 10 long chain branches per million carbon atoms.

Both the foregoing summary and the following detailed description provide examples and are explanatory only. Accordingly, the foregoing summary and the following detailed description should not be considered to be restrictive. Further, features or variations may be provided in addition to those set forth herein. For example, certain aspects may be directed to various feature combinations and sub-combinations described in the detailed description.

DEFINITIONS

Figure 1:
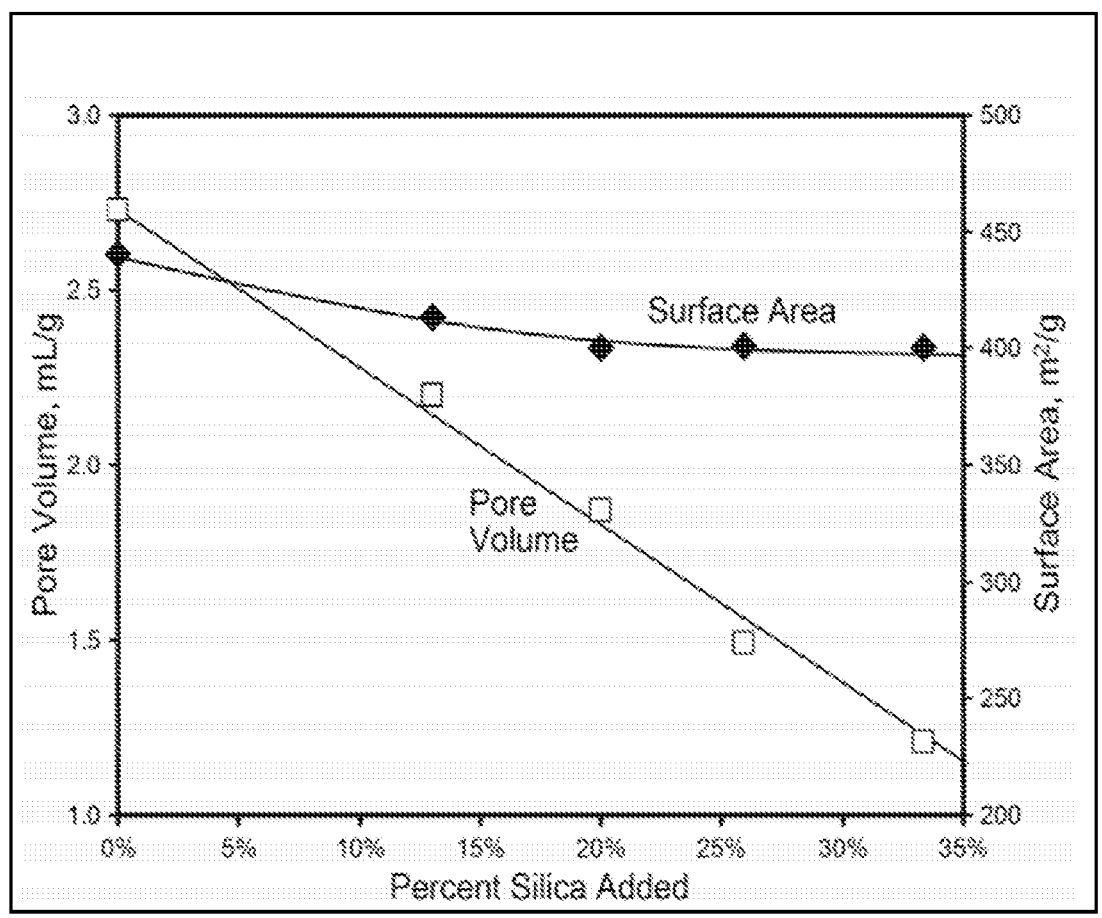
FIG. 1 presents a plot of the total pore volume and total surface area of the catalysts of Examples 1-5 containing from zero to 33 wt. % added silica.

To define more clearly the terms used herein, the following definitions are provided. Unless otherwise indicated, the following definitions are applicable to this disclosure. If a term is used in this disclosure but is not specifically defined herein, the definition from the IUPAC Compendium of Chemical Terminology, $2^{nd}$ Ed (1997), can be applied, as long as that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein controls.

Herein, features of the subject matter are described such that, within particular aspects, a combination of different features can be envisioned. For each and every aspect and each and every feature disclosed herein, all combinations that do not detrimentally affect the catalysts, supports, compositions, processes, or methods described herein are contemplated with or without explicit description of the particular combination. Additionally, unless explicitly recited otherwise, any aspect or feature disclosed herein can be combined to describe inventive catalysts, supports, compositions, processes, or methods consistent with the present disclosure.

Generally, groups of elements are indicated using the numbering scheme indicated in the version of the periodic table of elements published in *Chemical and Engineering News*, 63(5), 27, 1985. In some instances, a group of elements can be indicated using a common name assigned to the group; for example, alkali metals for Group 1 elements, alkaline earth metals for Group 2 elements, transition metals for Group 3-12 elements, and halogens or halides for Group 17 elements.

The term "hydrocarbon" whenever used in this specification and claims refers to a compound containing only carbon and hydrogen, whether saturated or unsaturated. Other identifiers can be utilized to indicate the presence of particular groups in the hydrocarbon (e.g., halogenated hydrocarbon indicates the presence of one or more halogen atoms replacing an equivalent number of hydrogen atoms in the hydrocarbon). The term "hydrocarbyl group" is used herein in accordance with the definition specified by IUPAC: a univalent group formed by removing a hydrogen atom from a hydrocarbon (that is, a group containing only carbon and hydrogen). Non-limiting examples of hydrocarbyl groups include alkyl, alkenyl, aryl, and aralkyl groups, amongst other groups.

For any particular compound or group disclosed herein, any name or structure (general or specific) presented is intended to encompass all conformational isomers, regioisomers, stereoisomers, and mixtures thereof that can arise from a particular set of substituents, unless otherwise specified. The name or structure (general or specific) also encompasses all enantiomers, diastereomers, and other optical isomers (if there are any) whether in enantiomeric or racemic forms, as well as mixtures of stereoisomers, as would be recognized by a skilled artisan, unless otherwise specified. For instance, a general reference to pentane includes n-pentane, 2-methyl-butane, and 2,2-dimethylpropane; and a general reference to a butyl group includes a n-butyl group, a sec-butyl group, an iso-butyl group, and a t-butyl group.

Unless otherwise specified, the term "substituted" when used to describe a group, for example, when referring to a substituted analog of a particular group, is intended to describe any non-hydrogen moiety that formally replaces a hydrogen in that group, and is intended to be non-limiting. Also, unless otherwise specified, a group or groups can also be referred to herein as "unsubstituted" or by equivalent terms such as "non-substituted," which refers to the original group in which a non-hydrogen moiety does not replace a hydrogen within that group. Moreover, unless otherwise specified, "substituted" is intended to be non-limiting and include inorganic substituents or organic substituents as understood by one of ordinary skill in the art.

The terms "contacting" and "combining" are used herein to describe catalysts, supports, compositions, processes, and methods in which the materials or components are contacted or combined together in any order, in any manner, and for any length of time, unless otherwise specified. For example, the materials or components can be blended, mixed, slurried, dissolved, reacted, treated, compounded, impregnated, or otherwise contacted or combined in some other manner or by any suitable method or technique.

In this disclosure, while catalysts, supports, compositions, processes, and methods are described in terms of "comprising" various components or steps, the catalysts, supports, compositions, processes, and methods also can "consist essentially of" or "consist of" the various components or steps, unless stated otherwise.

The terms "a," "an," and "the" are intended to include plural alternatives, e.g., at least one. For instance, the disclosure of "a solid support," "a chromium-containing compound," etc., is meant to encompass one, or mixtures or combinations of more than one, solid support, chromium-containing compound, etc., unless otherwise specified.

The term "polymer" is used herein generically to include olefin homopolymers, copolymers, terpolymers, and the like, as well as alloys and blends thereof. The term "polymer" also includes impact, block, graft, random, and alternating copolymers. A copolymer can be derived from an olefin monomer and one olefin comonomer, while a terpolymer can be derived from an olefin monomer and two olefin comonomers. Accordingly, "polymer" encompasses copolymers and terpolymers. Similarly, the scope of the term "polymerization" includes homopolymerization, copolymerization, and terpolymerization. Therefore, an ethylene polymer would include ethylene homopolymers, ethylene copolymers (e.g., ethylene/α-olefin copolymers), ethylene terpolymers, and the like, as well as blends or mixtures thereof. Thus, an ethylene polymer encompasses polymers often referred to in the art as LLDPE (linear low density polyethylene) and HDPE (high density polyethylene). As an example, an ethylene copolymer can be derived from ethylene and a comonomer, such as 1-butene, 1-hexene, or 1-octene. If the monomer and comonomer were ethylene and 1-hexene, respectively, the resulting polymer can be categorized an as ethylene/1-hexene copolymer. The term "polymer" also includes all possible geometrical configurations, if present and unless stated otherwise, and such configurations can include isotactic, syndiotactic, and random symmetries. The term "polymer" also is meant to include all molecular weight polymers, and is inclusive of lower molecular weight polymers or oligomers.

The terms "catalyst composition," "catalyst mixture," "catalyst system," and the like, do not depend upon the actual product or composition resulting from the contact or reaction of the initial components of the disclosed or claimed catalyst composition/mixture/system, the nature of the active catalytic site, or the fate of the co-catalyst or the chromium supported catalyst after combining these components. Therefore, the terms "catalyst composition," "catalyst mixture," "catalyst system," and the like, encompass the initial starting components of the composition, as well as whatever product(s) may result from contacting these initial starting components, and this is inclusive of both heterogeneous and homogenous catalyst systems or compositions. The terms "catalyst composition," "catalyst mixture," "catalyst system," and the like, may be used interchangeably throughout this disclosure.

A "water-soluble" material is meant to indicate that the material is dissolved in water at standard temperature (25° C.) and pressure (1 atm); in this regard, there is no visual precipitation of the material in water. Likewise, a "solution" is meant to indicate that there is no visual precipitate at standard temperature and pressure.

Various numerical ranges are disclosed herein. When a range of any type is disclosed or claimed, the intent is to disclose or claim individually each possible number that such a range could reasonably encompass, including end points of the range as well as any sub-ranges and combinations of sub-ranges encompassed therein, unless otherwise specified. As a representative example, the present disclosure recites that a reinforced catalyst consistent with aspects of this invention can have a total pore volume in a range from about 1 to about 5 mL/g. By a disclosure that the total pore volume can be in a range from about 1 to about 5 mL/g, the intent is to recite that the pore volume can be any pore volume in the range and, for example, can be equal to about 1, about 1.5, about 2, about 2.5, about 3, about 3.5, about 4, about 4.5, or about 5 mL/g. Additionally, the total pore volume can be within any range from about 1 to about 5 mL/g (e.g., from about 1.5 to about 3.5 mL/g), and this also includes any combination of ranges between about 1 and about 5 mL/g (e.g., the pore volume can be in a range from about 1.2 to about 2 mL/g, or from about 3 to about 5 mL/g). Likewise, all other ranges disclosed herein should be interpreted in a manner similar to this example.

The term "about" means that amounts, sizes, formulations, parameters, and other quantities and characteristics are not and need not be exact, but can be approximate including being larger or smaller, as desired, reflecting tolerances, conversion factors, rounding off, measurement errors, and the like, and other factors known to those of skill in the art. In general, an amount, size, formulation, parameter or other quantity or characteristic is "about" or "approximate" whether or not expressly stated to be such. The term "about" also encompasses amounts that differ due to different equilibrium conditions for a composition resulting from a particular initial mixture. Whether or not modified by the term "about," the claims include equivalents to the quantities. The term "about" can mean within 10% of the reported numerical value, and often within 5% of the reported numerical value.

Although any methods, devices, and materials similar or equivalent to those described herein can be used in the practice or testing of the invention, the typical methods, devices, and materials are herein described.

All publications and patents mentioned herein are incorporated herein by reference for the purpose of describing and disclosing, for example, the constructs and methodologies that are described in the publications, which might be used in connection with the presently described invention.

DETAILED DESCRIPTION OF THE INVENTION

Disclosed herein are processes for producing silica-reinforced solid supports and silica-reinforced chromium supported catalysts, in which additional silica is deposited onto traditional solid oxides and traditional chromium supported catalysts, respectively.

A silica-containing material, such as a silicate oligomer, can be deposited on or impregnated into a traditional solid oxide (e.g., silica) or a traditional chromium supported catalyst (e.g., chromium/silica). The treatment can result in a secondary deposition of silica into the original silica matrix, which can strengthen the overall structure, but also can dramatically change the porosity of the support or the catalyst, with surprising impacts on both surface area and pore volume.

Beneficially, the silica reinforcement can be used to manipulate and control the resultant properties of the polymer. Unexpectedly, the molecular weight, molecular weight distribution, viscosity, and long chain branching properties of the polymer were found to be strongly influenced by the deposition of additional silica.

Also beneficially, the processes disclosed herein are readily adaptable to commercial practice, given that many polymer manufacturers usually start with pre-formed solid oxides or pre-formed supported catalysts. For example, one can easily deposit additional silica onto the solid oxide during the chromium impregnation process. As another example, one can easily deposit additional silica onto the supported catalyst during a thermal treatment step, such as in a fluidized bed activation or calcination process.

Silica-Reinforced Chromium Supported Catalysts

A representative and non-limiting example of a silica-reinforced (or silica-deposited) chromium supported catalyst consistent with this invention can comprise a solid support, and from about 0.1 to about 15 wt. % chromium, based on the total weight of the reinforced catalyst. The reinforced catalyst can be characterized by a total pore volume of at least about 0.8 mL/g, a total BET surface area of at least about 200 $m^2/g$, and a micropore BET surface area (<50 Å) that is from about 10% to about 60% of the total BET surface area. Another representative and non-limiting example of a silica-reinforced (or silica-deposited) chromium supported catalyst consistent with this invention can comprise a solid support, and from about 0.5 to about 5 wt. % chromium, based on the total weight of the reinforced catalyst. The reinforced catalyst can be characterized by a total pore volume from about 1 to about 5 mL/g, a total BET surface area from about 250 to about 550 $m^2/g$, and a micropore BET surface area (<50 Å) that is from about 10 to about 50% of the total BET surface area. These illustrative and non-limiting examples of silica-reinforced chromium supported catalysts consistent with the present invention also can have any of the catalyst properties or attributes listed below and in any combination, unless indicated otherwise.

The amount of chromium in the silica-reinforced chromium supported catalysts (or activated silica-reinforced chromium supported catalysts) disclosed herein is not particularly limited. Generally, however, the amount of chromium in the silica-reinforced chromium supported catalyst (whether activated or not) can range from about 0.1 to about 15 wt. %; alternatively, from about 0.1 to about 10 wt. %; alternatively, from about 0.5 to about 15 wt. %; alternatively, from about 0.5 to about 5 wt. %; alternatively, from about 0.5 to about 2.5 wt. %; alternatively, from about 1 to about 10 wt. %; or alternatively, from about 1 to about 6 wt. %. These weight percentages are based on the amount of chromium relative to the total weight of the silica-reinforced chromium supported catalyst.

Prior to a thermal treatment step, at least about 75 wt. % of the chromium can be present in an oxidation state of three or less. In further aspects, at least about 85 wt. %, at least about 90 wt. %, or at least about 95 wt. %, of the chromium can be present in an oxidation state of three or less. When subjected to a thermal treatment step (calcination/activation), it is believed that the silica-reinforced chromium supported catalyst will no longer have the chromium in a lower oxidation state. Typically, all or a large portion of the chromium will be converted to hexavalent chromium.

Generally, the total pore volume (total pore volume via nitrogen sorption) of the silica-reinforced chromium supported catalyst (or activated silica-reinforced chromium supported catalyst) falls within a range from about 0.8 to about 5 mL/g, but is not limited thereto. Illustrative and non-limiting ranges for the total pore volume include from about 1 to about 5 mL/g, from about 1 to about 4 mL/g, from about 1 to about 3 mL/g, from about 1.2 to about 4.5 mL/g, from about 1.2 to about 3 mL/g, or from about 1.5 to about 3.5 mL/g.

The silica-reinforced chromium supported catalyst often has a micropore pore volume (<50 Å) that is from about 1% to about 30%, or from about 1% to about 20%, of the total pore volume. In some aspects, the micropore volume can be from about 1% to about 15%, from about 1.2% to about 20%, or from about 1.5% to about 12%, of the total pore volume.

The total BET surface area of the silica-reinforced chromium supported catalyst (or activated silica-reinforced chromium supported catalyst) is not limited to any particular range, but typically falls within a range from about 200 to about 750 m$^2$/g. Illustrative and non-limiting ranges for the total BET surface area include from about 200 to about 600 m$^2$/g, from about 200 to about 500 m$^2$/g, from about 250 to about 650 m$^2$/g, from about 250 to about 550 m$^2$/g, from about 250 to about 450 m$^2$/g, or from about 275 to about 525 m$^2$/g.

The silica-reinforced chromium supported catalyst often has a micropore BET surface area (<50 Å) that is from about 10% to about 60% of the total BET surface area. In some aspects, the micropore BET surface area can be from about 10% to about 50%, from about 15% to about 50%, from about 12% to about 40%, from about 12% to about 25%, from about 20% to about 60%, or from about 20% to about 50%, of the total BET surface area.

The silica-reinforced chromium supported catalyst (or activated silica-reinforced chromium supported catalyst) can have any suitable particle size, as would be recognized by those of skill in the art. Illustrative and non-limiting ranges for the average (d50) particle size of the silica-reinforced chromium supported catalyst (or activated silica-reinforced chromium supported catalyst) can include from about 10 to about 500 microns, from about 25 to about 250 microns, from about 40 to about 160 microns, or from about 40 to about 120 microns.

In particular aspects of this invention, there can be substantially no VOC's (volatile organic compounds) emitted during the thermal treatment (calcination/activation) step. For instance, there can be substantially no VOC's emitted during the thermal treatment step when the silicate oligomer is completely hydrolyzed. Thus, in accordance with certain aspects of this invention, the silica-reinforced chromium supported catalyst (or activated silica-reinforced chromium supported catalyst) can contain less than or equal to about 5 wt. % carbon, less than or equal to about 3 wt. % carbon, or less than or equal to about 2 wt. % carbon, and in further aspects, less than or equal to about 1 wt. % carbon, less than or equal to about 0.5 wt. % carbon, or less than or equal to about 0.25 wt. % carbon. These weight percentages are based on the amount of carbon relative to the total weight of the silica-reinforced chromium supported catalyst (whether activated or not).

Generally, the silica-reinforced chromium supported catalyst contains at least about 5 wt. %, or at least about 10 wt. %, of added silica. Typical amounts of the added silica can include from about 5 to about 50 wt. %, from about 5 to about 40 wt. %, from about 10 to about 50 wt. %, from about 10 to about 40 wt. %, or from about 10 to about 35 wt. %, of added silica. This percentage is based on the weight of added silica (SiO$_2$) to the total weight of the silica-reinforced chromium supported catalyst.

Any suitable silica-containing solid oxide (preformed silica-containing solid oxide, and typically dried) can be used as the solid support for the silica-reinforced chromium supported catalyst. In one aspect, for instance, the solid support can comprise silica, silica-alumina, silica-titania, silica-zirconia, silica-titania-magnesia, and the like, as well as any combination thereof. In another aspect, the solid support can be, or can comprise, silica, silica-alumina, silica-titania, or silica-zirconia. Yet, in another aspect, the solid support can be, or can comprise, silica.

Thus, silica-reinforced chromium supported catalysts consistent with certain aspects of this invention can comprise chromium/silica, chromium/silica-titania, chromium/silica-titania-magnesia, chromium/silica-alumina, and the like, as well as any combination thereof. For instance, the silica-reinforced chromium supported catalyst can comprise chromium/silica in a particular aspect of this invention.

Silica-Reinforced Solid Supports

A representative and non-limiting example of a silica-reinforced (or silica-deposited) solid support can comprise a solid oxide, and the solid support can be characterized by a total pore volume of at least about 0.8 mL/g, a total BET surface area of at least about 200 m$^2$/g, and a micropore BET surface area (<50 Å) that is from about 10% to about 60% of the total BET surface area. Another representative and non-limiting example of a silica-reinforced (or silica-deposited) solid support consistent with this invention can comprise a solid oxide, and the solid support can be characterized by a total pore volume from about 1 to about 5 mL/g, a total BET surface area from about 250 to about 550 m$^2$/g, and a micropore BET surface area (<50 Å) that is from about 10 to about 50% of the total BET surface area. These illustrative and non-limiting examples of silica-reinforced solid supports consistent with the present invention also can have any of the solid support properties or attributes listed below and in any combination, unless indicated otherwise.

Generally, the total pore volume (total pore volume via mercury intrusion) of the silica-reinforced solid support (or calcined silica-reinforced solid support) falls within a range from about 0.8 to about 5 mL/g, but is not limited thereto. Illustrative and non-limiting ranges for the total pore volume include from about 1 to about 5 mL/g, from about 1 to about 4 mL/g, from about 1 to about 3 mL/g, from about 1.2 to about 4.5 mL/g, from about 1.2 to about 3 mL/g, or from about 1.5 to about 3.5 mL/g.

The silica-reinforced solid support often has a micropore pore volume (<50 Å) that is from about 1% to about 30%, or from about 1% to about 20%, of the total pore volume. In some aspects, the micropore volume can be from about 1% to about 15%, from about 1.2% to about 20%, or from about 1.5% to about 12%, of the total pore volume.

The total BET surface area of the silica-reinforced solid support (or calcined solid support) is not limited to any particular range, but typically falls within a range from about 200 to about 750 m$^2$/g. Illustrative and non-limiting ranges for the total BET surface area include from about 200 to about 600 m$^2$/g, from about 200 to about 500 m$^2$/g, from about 250 to about 650 m$^2$/g, from about 250 to about 550 m$^2$/g, from about 250 to about 450 m$^2$/g, or from about 275 to about 525 m$^2$/g.

The silica-reinforced solid support often has a micropore BET surface area (<50 Å) that is from about 10% to about 60% of the total BET surface area. In some aspects, the micropore BET surface area can be from about 10% to about 50%, from about 15% to about 50%, from about 12% to about 40%, from about 12% to about 25%, from about 20% to about 60%, or from about 20% to about 50%, of the total BET surface area.

The silica-reinforced solid support (or calcined solid support) can have any suitable particle size, as would be recognized by those of skill in the art. Illustrative and non-limiting ranges for the average (d50) particle size of the silica-reinforced solid support (or calcined solid support) can include from about 10 to about 500 microns, from about 25 to about 250 microns, from about 40 to about 160 microns, or from about 40 to about 120 microns.

Similar to the silica-reinforced chromium supported catalyst, the silica-reinforced solid support (or calcined silica-reinforced solid support) can contain less than or equal to about 5 wt. % carbon, less than or equal to about 3 wt. % carbon, or less than or equal to about 2 wt. % carbon, and in further aspects, less than or equal to about 1 wt. % carbon, less than or equal to about 0.5 wt. % carbon, or less than or equal to about 0.25 wt. % carbon. These weight percentages are based on the amount of carbon relative to the total weight of the silica-reinforced solid support (whether calcined or not).

Generally, the silica-reinforced solid support contains at least about 5 wt. %, or at least about 10 wt. %, of added silica. Typical amounts of the added silica can include from about 5 to about 50 wt. %, from about 5 to about 40 wt. %, from about 10 to about 50 wt. %, from about 10 to about 40 wt. %, or from about 10 to about 35 wt. %, of added silica. This percentage is based on the weight of added silica (SiO$_2$) to the total weight of the silica-reinforced solid support.

Any suitable silica-containing solid oxide (preformed silica-containing solid oxide, and typically dried) can be used as the solid oxide for the silica-reinforced solid support. In one aspect, for instance, the solid oxide can comprise silica, silica-alumina, silica-titania, silica-zirconia, silica-titania-magnesia, and the like, as well as any combination thereof. In another aspect, the solid oxide can be, or can comprise, silica, silica-alumina, silica-titania, or silica-zirconia. Yet, in another aspect, the solid oxide can be, or can comprise, silica.

Processes for Forming Silica-Reinforced Solid Supports

Aspects of this invention are directed to processes for reinforcing a solid support. One such process can comprise contacting a solid oxide with a silicon-containing material to deposit at least about 5 wt. % silica on the solid oxide to form a silica-reinforced solid support. The amount (in wt. %) of the added silica (SiO$_2$) is based on the total weight of the silica-reinforced solid support. Generally, the features of this process for reinforcing a solid support (e.g., the solid oxide, the amount of added silica, and the conditions under which the silica-reinforced solid support is formed, among others) are independently described herein and these features can be combined in any combination to further describe the disclosed processes for reinforcing a solid support. Moreover, additional process steps can be performed before, during, and/or after any of the steps in any of the processes disclosed herein, and can be utilized without limitation and in any combination to further describe the disclosed processes, unless stated otherwise. Further, any silica-reinforced solid supports produced in accordance with the disclosed processes are within the scope of this disclosure and are encompassed herein.

In these processes, any suitable silica-containing solid oxide (preformed silica-containing solid oxide, and typically dried) can be used as the solid oxide for the silica-reinforced solid support. In one aspect, for instance, the solid oxide can comprise silica, silica-alumina, silica-titania, silica-zirconia, silica-titania-magnesia, and the like, as well as any combination thereof. In another aspect, the solid oxide can be, or can comprise, silica, silica-alumina, silica-titania, or silica-zirconia. Yet, in another aspect, the solid oxide can be, or can comprise, silica. In still another aspect, the solid oxide can be, or can comprise, a zeolite.

Any suitable zeolite can be used, for instance, large pore and medium pore zeolites. Large pore zeolites often have average pore diameters in a range of from about 7 Å to about 12 Å, and non-limiting examples of large pore zeolites include L-zeolite, Y-zeolite, mordenite, omega zeolite, beta zeolite, and the like. Medium pore zeolites often have average pore diameters in a range of from about 5 Å to about 7 Å. The term "zeolite" generally refers to a particular group of hydrated, crystalline metal aluminosilicates. These zeolites exhibit a network of SiO$_4$ and AlO$_4$ tetrahedra in which aluminum and silicon atoms are crosslinked in a three-dimensional framework by sharing oxygen atoms. In the framework, the ratio of oxygen atoms to the total of aluminum and silicon atoms can be equal to 2. The framework exhibits a negative electrovalence that typically can be balanced by the inclusion of cations within the crystal, such as metals, alkali metals, alkaline earth metals, and/or hydrogen.

In some aspects, the solid oxide can be, or can comprise, an L-type zeolite. L-type zeolite supports are a sub-group of zeolitic supports, which can contain mole ratios of oxides in accordance with the formula: M$_{2/n}$OAl$_2$O$_3$xSiO$_2$yH$_2$O. In this formula, "M" designates an exchangeable cation (one or more) such as barium, calcium, cerium, lithium, magnesium, potassium, sodium, strontium, cesium, and/or zinc, as well as non-metallic cations like hydronium and ammonium ions, which can be replaced by other exchangeable cations without causing a substantial alteration of the basic crystal structure of the L-type zeolite. The "n" in the formula represents the valence of "M"; "x" is 2 or greater; and "y" is the number of water molecules contained in the channels or interconnected voids of the zeolite.

Generally, at least about 5 wt. % silica, or at least about 10 wt. % silica, can be added to (deposited on) the solid oxide. Typical amounts of the added silica can include from about 5 to about 50 wt. %, from about 5 to about 40 wt. %, from about 10 to about 50 wt. %, from about 10 to about 40 wt. %, or from about 10 to about 35 wt. %, of added silica. This percentage is based on the weight of added silica (SiO$_2$) to the total weight of the silica-reinforced solid support.

The specific silicon-containing material used in the process for reinforcing a solid support is not particularly limited. The silicon-containing material can comprise any suitable silicon compound, representative and non-limiting examples of which can include a silicon alkoxide (e.g., tetraethyl orthosilicate), a silicon halide, a silicon hydride, a silane, a hydrocarbyl silane, a siloxane, and the like, as well as combinations thereof.

Additionally or alternatively, the silicon-containing material can comprise any suitable silicate oligomer, such as a tetraethyl orthosilicate oligomer. The molecular weight of the oligomer is not particularly limited, although a silicate oligomer having a Mn (number-average molecular weight) from about 100 to about 2000 g/mol, from about 250 to about 2000 g/mol, or from about 500 to about 1200 g/mol, often can be used.

The silicate oligomer can be produced via any suitable process, a non-limiting example of which is to contact a suitable silicon compound with water and an acid or a base in a suitable solvent to form a solution containing the silicate oligomer. In one aspect, the silicon compound, water, the acid or the base, and the solvent can be contacted or combined together in any order, while in another aspect, the silicon compound can be contacted first with the solvent, followed by addition of the acid or the base, and then water to form the solution.

The relative amounts of water and the silicon compound are not particularly limited, so long as the molecular size of the formed silicate oligomer (partially-hydrolyzed silicate oligomer), does not interfere with migration into the pores of the solid oxide in the process for reinforcing a solid support. Generally, typical ranges for the molar ratio of water to silicon ($H_2O$:Si) can include, but are not limited to, from about 0.05:1 to about 1.95:1, from about 0.1:1 to about 1.8:1, from about 0.3:1 to about 1.5:1, from about 0.5:1 to about 1.3:1, from about 0.05:1 to about 0.95:1, from about 0.1:1 to about 0.9:1, from about 0.2:1 to about 0.8:1, or from about 0.3:1 to about 0.7:1, and the like.

The specific silicon compound used to produce the oligomer is not particularly limited. Representative and non-limiting examples of suitable silicon compounds can include a silicon alkoxide (e.g., tetraethyl orthosilicate), a silicon halide, a silicon hydride, a silane, a hydrocarbyl silane, a siloxane, and the like, as well as combinations thereof. Likewise, any suitable solvent can be used, but often the solvent is miscible with both oil and water. Representative and non-limiting examples of suitable organic solvents can include a ketone (e.g., acetone), an alcohol (e.g., methanol, ethanol, n-propanol, isopropanol, n-butanol, etc.), a glycol, an ester, an ether, acetonitrile, and the like. Additionally, combinations of two or more organic solvents can be used.

The amount of the acid or base is relatively small compared to that of the solvent. For instance, the weight ratio of the acid or base to the solvent (acid:solvent or base:solvent) often can be less than or equal to about 1:20; alternatively, less than or equal to about 1:50; or alternatively, less than or equal to about 1:100. Illustrative ranges for the weight ratio acid:solvent or base:solvent can include, but are not limited to, from about 1:5000 to about 1:10, from about 1:2000 to about 1:20, or from about 1:1000 to about 1:100, and the like.

When an acid is used to produce the oligomer, any suitable acid can be used, non-limiting examples of which include sulfuric acid, nitric acid, hydrochloric acid, hydrobromic acid, perchloric acid, sulfamic acid, and the like, as well as any mixture or combination thereof. Similarly, when a base is used to produce the oligomer, any suitable base can be used, non-limiting examples of which include ammonia, ammonium hydroxide, sodium hydroxide, magnesium hydroxide, an alkyl-substituted ammonium hydroxide, an organic amine, and the like, as well as any mixture or combination thereof.

The formation of the solution containing the silicate oligomer can be conducted at any suitable temperature and for any suitable period of time. Representative and non-limiting ranges for the temperature can include from about 5° C. to about 80° C., from about 15° C. to about 60° C., from about 10° C. to about 40° C., or from about 20° C. to about 50° C. These temperature ranges also are meant to encompass circumstances where the silicate oligomer formation is performed at a series of different temperatures, instead of at a single fixed temperature, falling within the respective temperature ranges.

Similarly, the time period for contacting the silicon compound, water, the acid or base, and the solvent (or for the formation of the solution containing the silicate oligomer) is not particularly limited, and can be conducted for any suitable period of time. In some aspects, the time period can be least about 1 minute, at least about 5 minutes, at least about 10 minutes, at least about 15 minutes, or at least about 30 minutes. In other aspects, the time period can be from about 30 seconds to about 48 hours, from about 1 minute to about 24 hours, from about 5 minutes to about 8 hours, from about 15 minutes to about 8 hours, or from about 5 minutes to about 2 hours.

Referring now to reinforcing the solid support, the step of contacting the solid oxide with the silicon-containing material (monomer or oligomers, or both) to deposit silica on the solid oxide also can be conducted at any suitable temperature and for any suitable time periods. Representative and non-limiting ranges for the temperature can include from about 5° C. to about 80° C., from about 15° C. to about 60° C., from about 10° C. to about 40° C., or from about 20° C. to about 50° C. These temperature ranges also are meant to encompass circumstances where silica deposition or formation of the silica-reinforced solid support is performed at a series of different temperatures, instead of at a single fixed temperature, falling within the respective temperature ranges. Similarly, the time period for silica deposition or formation of the silica-reinforced solid support is not particularly limited, and can be conducted for any suitable period of time. In some aspects, the time period can be least about 1 minute, at least about 5 minutes, at least about 10 minutes, at least about 15 minutes, or at least about 30 minutes. In other aspects, the time period can be from about 30 seconds to about 48 hours, from about 1 minute to about 24 hours, from about 5 minutes to about 8 hours, from about 15 minutes to about 8 hours, or from about 5 minutes to about 2 hours.

Consistent with aspects of this invention, the silicon-containing material (monomer or oligomers, or both) can have (or can be configured to have) molecular sizes sufficient to allow migration into the pores of the solid oxide during the silica addition step. While not wishing to be bound by the following theory, it is believed that the molecular sizes can be significantly less than 100 Å, and in some instances, from about 2 Å, about 5 Å, or about 7 Å, up to about 15 Å, about 20 Å, or about 25 Å, while not being limited thereto.

In some aspects, the solid oxide can be mixed or slurried with the silicon-containing material in a suitable solvent. As an example, the solid oxide can be mixed or slurried with the solution containing the (partially-hydrolyzed) silicate oligomer. Optionally, additional water can be used after the contacting of the solid oxide and the silicon-containing material. The additional water can serve to fully hydrolyze the silicate oligomer, and the amount of additional water is not particularly limited. Representative and non-limiting ranges for the molar ratio of the amount of additional water to silicon in the silicate oligomer ($H_2O:Si$) can be at least about 1:1, at least about 1.5:1, at least about 2:1, at least about 4:1, at least about 7:1, at least about 10:1, at least about 20:1, or at least about 100:1, and the like. Any order of sequence of combining the solid oxide, the silicon-containing material, and the solvent can be employed. For example, the silicon-containing material can be combined first with the solid oxide, followed by the solvent, and optionally additional water. Alternatively, the silicon-containing material can be combined first with the solvent, followed by the solid oxide. As noted above, the components can be contacted or combined by any suitable means, such as by mixing or slurrying the components, to produce the silica-reinforced solid support.

The silica-reinforced solid support then can be dried. Any method or technique for drying can be used. For instance, if no additional water is added, the solid oxide can be combined (or impregnated) with the silicon-containing material to incipient wetness, wherein the pore filling or "incipient wetness" impregnation technique used is a method in which an amount of the mixture or solution of the silicon-containing material roughly equivalent to the pore volume of the solid oxide is mixed with the solid oxide until the pores are filled. In the incipient wetness impregnation technique, the solid oxide can be placed into a rotating drum, and the mixture or solution of the silicon-containing material can be poured, sprayed or otherwise uniformly added onto the solid oxide. The end point of this method can vary somewhat, so that the silica-reinforced solid support could have a free-flowing dry appearance to the first appearances of clumping. However, typically there would not be any free-flowing liquid present when the incipient wetness method is employed. As would be recognized by those of skill in the art, other suitable techniques and equipment can be employed when no additional water is added, and such techniques and equipment are encompassed herein.

In aspects where no additional water is added, the drying step can encompass a wide range of drying times, drying temperatures, and drying pressures. For example, the drying time can range from about 1 to about 48 hours, from about 2 to about 24 hours, or from about 2 to about 12 hours, and the drying temperature can range from about 15° C. to about 200° C., from about 25° C. to about 150° C., or from about 50° C. to about 125° C. The drying pressure can be at or around atmospheric pressure, but in many instances, the drying step can be conducted under vacuum conditions at any suitable sub-atmospheric pressure, such as less than 100 torr (13.3 kPa), less than 50 (6.67 kPa) torr, or less than 10 torr (1.33 kPa).

Various types of dryer devices can be used for the drying step (typically when additional water has been added), such as tray dryers, rotary dryers, fluidized bed dryers, and spray dryers, although not limited thereto. Likewise, the flow of the drying medium (gas flow) relative to the silica-reinforced solid support is not particularly limited, and encompasses concurrent flow, countercurrent flow, and flow through (e.g., such as in a fluidized bed).

In some aspects of this invention, the drying step can comprise spray drying. Generally, spray drying can be used to transform the wet silica-reinforced solid support (e.g., a slurry or suspension of the solid support in water or a solvent) to a dried particulate or powder form by spraying a feed stream containing the wet support into a device containing a hot drying gas (usually air), in which the residual water or solvent evaporates from the silica-reinforced solid support.

In the spray drying process, the feed stream can be sprayed into a drying chamber in the form of droplets, and contacted with a large volume of a hot gas, which directly contacts the wet solid support. Typical gas inlet temperatures range from 125° C. to about 800° C., or from about 150° C. to about 500° C., but are not limited thereto. The flow of the gas relative to the flow of the solid support into the spray dryer can be concurrent flow, countercurrent flow, or mixed flow. After drying, the gas stream and the dried silica-reinforced solid support are separated. If needed, fines can be removed in filter collectors or cyclones. The dried silica-reinforced solid support can have the form of free-flowing particulate solids.

The initial feed into the spray dryer can be subjected to an atomization process, which can employ, for instance, a high-pressure nozzle, a two-fluid nozzle, or a high-speed centrifugal disk. High-pressure nozzles result in atomization by forcing the solid support slurry under high pressure through a small nozzle orifice, the size of which can depend on the desired pressure and particle size of the solids in the slurry, among other factors. Wear on the nozzle orifice and plugging can result during long-term operation; therefore, regular maintenance can be beneficial to ensure proper atomization. Two-fluid nozzles have the advantage of a relatively low operating pressure, and often can be used when the feed stream is a thick or high-solids slurry, which does not work well in high-pressure nozzle systems. The atomizing fluid can be steam or air.

High-speed centrifugal disks atomize the solid support slurry by contacting the slurry with a rapidly rotating disk. Disk diameter and disk speed (e.g., 3,000 rpm and above) can be varied to produce a suitable droplet size for drying. Beneficially, disk atomization is not subject to wear and plugging, as in the nozzle systems. Disk rotation can be driven by any suitable motor or technique.

Regardless of the atomization process, the spray drying process can be configured to maintain the spherical nature of the silica-reinforced solid support. The average particle size of the solid support can be maintained in many instances, and generally, the average particle size depends upon the atomization process, the solids content of the solid support feed stream, feed stream viscosity, and feed rate, among other factors. Likewise, bulk density of the dried solid support can be controlled based on operating conditions of the spray dryer, such as droplet size, inlet gas temperature, and air turbulence, among other factors.

Mixing of the gas stream (e.g., air) and the droplet in the drying chamber can be accomplished, for example, using concurrent flow of gas and solids (e.g., horizontal or vertical spray dryers), or countercurrent flow of gas and solids. In the latter case, upward air flow can carry fines to the top of the chamber for easy removal. Mixed flow spray dryers combine countercurrent and concurrent drying, with complex flow patterns and high turbulence for efficient heat and mass transfer.

A benefit to spray drying can be the short contact time of the silica-reinforced solid support to elevated temperatures in the drying chamber. Thus, in addition to average particle size, the spray drying process can be configured to produce dried solid supports that have surface areas and pore volumes that are comparable to the starting material (i.e., prior to spray drying).

Optionally, after drying, the silica-reinforced solid support can be calcined, which can be conducted at a variety of temperatures and time periods. Typical peak calcining temperatures often fall within a range from about 200° C. to about 800° C., such as from about 250° C. to about 600° C., from about 300° C. to about 600° C., or from about 300° C. to about 500° C. In these and other aspects, these temperature ranges also are meant to encompass circumstances where the calcination step is conducted at a series of different temperatures (e.g., an initial calcination temperature, a peak calcination temperature), instead of at a single fixed temperature, falling within the respective ranges. For instance, the calcination step can start at an initial temperature that is the same as the drying temperature in the drying step. Subsequently, the temperature of the calcination can be increased to a peak calcining temperature, for example, in a range from about 250° C. to about 600° C.

The duration of the calcining step is not limited to any particular period of time. Hence, the calcining step can be conducted, for example, in a time period ranging from as little as 30-45 minutes to as long as 36-48 hours, or more. The appropriate calcining time can depend upon, for example, the initial/peak calcining temperature, among other variables. Generally, however, the calcining step can be conducted in a time period that can be in a range from about 30 minutes to about 48 hours, such as, for example, from about 1 hour to about 24 hours, from about 1 hour to about 12 hours, from about 2 hours to about 12 hours, or from about 2 hours to about 8 hours.

The calcining step can be conducted in a calcining gas stream that comprises (or consists essentially of, or consists of) an inert gas (e.g., nitrogen), oxygen, air, or any mixture or combination thereof. In some aspects, the calcining gas stream can comprise air, while in other aspects, the calcining gas stream can comprise a mixture of air and nitrogen. Yet, in certain aspects, the calcining gas stream can be an inert gas, such as nitrogen and/or argon.

The calcining step can be conducted using any suitable technique and equipment, whether batch or continuous. For instance, the calcining step can be performed in a belt calciner or, alternatively, a rotary calciner. In some aspects, the calcining step can be performed in a batch or continuous calcination vessel comprising a fluidized bed. As would be recognized by those of skill in the art, other suitable techniques and equipment can be employed for the calcining step, and such techniques and equipment are encompassed herein.

In another aspect, the solid oxide can be contacted with a silicon-containing material—for example, any of the silicon-containing materials disclosed herein—while thermally treating (calcining) to form the silica-reinforced solid support. As above, typical amounts of the added silica can include from about 5 to about 50 wt. %, from about 5 to about 40 wt. %, from about 10 to about 50 wt. %, from about 10 to about 40 wt. %, or from about 10 to about 35 wt. %, of added silica. This percentage is based on the weight of added silica ($SiO_2$) to the total weight of the silica-reinforced solid support.

Any of the silica-reinforced solid supports produced by any of the processes disclosed herein can be characterized by any combination of properties of the silica-reinforced solid supports disclosed herein: total pore volume, micropore pore volume, total BET surface area, micropore BET surface area, average (d50) particle size, amount of carbon, and/or amount of added silica. For example, the silica-reinforced solid supports produced by the disclosed processes can have a total pore volume of at least about 0.8 mL/g, a total BET surface area of at least about 200 $m^2/g$, and a micropore BET surface area (<50 Å) that is from about 10% to about 60% of the total BET surface area; or alternatively, a total pore volume from about 1 to about 5 mL/g, a total BET surface area from about 250 to about 550 $m^2/g$, and a micropore BET surface area (<50 Å) that is from about 10 to about 50% of the total BET surface area.

Processes for Forming Silica-Reinforced Chromium Catalysts

Aspects of this invention also are directed to processes for producing silica-reinforced chromium supported catalysts. In the processes for producing silica-reinforced solid supports, described hereinabove, chromium can be incorporated at any step in the respective processes. In one aspect, for example, chromium can be added during the oligomer formation step: the silicon compound, water, the acid or the base, and a chromium-containing compound can be contacted in any order or sequence in the solvent. In another aspect, chromium can be added during the silica deposition step: the solid oxide, the silicon-containing material, and a chromium-containing compound can be contacted or combined (e.g., mixed or slurried, in water or any suitable solvent) in any order or sequence. The resultant silica-reinforced chromium supported catalyst subsequently can be dried using any suitable technique. In yet another aspect, if the silica-reinforced solid support has already been produced, chromium can be incorporated by combining the solid support and a chromium-containing compound in a diluent (e.g., water or any suitable solvent disclosed herein), and subsequently dried. Silica-reinforced chromium supported catalysts produced in accordance with any of these processes are within the scope of this disclosure and are encompassed herein.

Any suitable chromium-containing compound (or chromium precursor) can be used to form the silica-reinforced chromium supported catalyst. Illustrative and non-limiting examples of chromium (II) compounds can include chromium (II) acetate, chromium (II) chloride, chromium (II) bromide, chromium (II) iodide, chromium (II) sulfate, and the like, as well as combinations thereof. Likewise, illustrative and non-limiting examples of chromium (III) compounds can include a chromium (III) carboxylate, a chromium (III) napthenate, a chromium (III) halide, chromium (III) sulfate, chromium (III) nitrate, a chromium (III) dionate, and the like, as well as combinations thereof. In some aspects, the chromium-containing compound can comprise chromium (III) acetate, chromium (III) acetylacetonate, chromium (III) chloride, chromium (III) bromide, chromium (III) sulfate, chromium (III) nitrate, and the like, as well as combinations thereof.

While not required, it can be beneficial for the chromium-containing compound to be soluble in the solvent, for instance, depending upon which step of the process is the chromium incorporation step. In such situations, the chromium-containing compound can comprise tertiary butyl chromate, a diarene chromium (0) compound, bis-cyclopentadienyl chromium (II), chromium (III) acetylacetonate, chromium acetate, and the like, or any combination thereof.

Similarly, and not required, it can be beneficial for the chromium-containing compound to be soluble in water, for instance, depending upon which step of the process is the chromium incorporation step. In such situations, the chromium-containing compound can comprise chromium trioxide, chromium acetate, chromium nitrate, and the like, or any combination thereof.

In some aspects, the chromium-containing compound can comprise chromium (II) acetate, chromium (II) chloride, chromium (II) bromide, chromium (II) iodide, chromium (II) sulfate, chromium (III) acetate, chromium (III) acetylacetonate, chromium (III) chloride, chromium (III) bromide, chromium (III) sulfate, chromium (III) nitrate, tertiary butyl chromate, a diarene chromium (0) compound, bis-cyclopentadienyl chromium (II), or chromium trioxide, and the like. Combinations of two or more chromium-containing compounds can be used.

The addition of a chromium-containing compound to form the silica-reinforced chromium supported catalyst can be conducted at any suitable temperature and for any suitable period of time. Typical temperatures and time periods are the same as those disclosed herein for the addition of the silicon-containing material to form the silica-reinforced solid support.

Consistent with other aspects of this invention, silica can added to a chromium supported catalyst to produce a silica-reinforced chromium supported catalyst. One such process for reinforcing a chromium supported catalyst can comprise contacting a chromium supported catalyst with a silicon-containing material to deposit at least about 5 wt. % silica on the catalyst, based on the weight of added silica ($SiO_2$) to the total weight of the reinforced catalyst.

Another process for producing a silica-reinforced chromium supported catalyst can comprise (or consist essentially of, or consist of) contacting a silicon compound with water and an acid or a base in a solvent to form a solution containing a silicate oligomer, and contacting the silicate oligomer (e.g., a solution containing the silicate oligomer) and a chromium supported catalyst to form the silica-reinforced chromium supported catalyst. At least about 5 wt. % of silica is deposited, based on the weight of added silica ($SiO_2$) to the total weight of the reinforced catalyst.

Generally, the features of these processes to produce the silica-reinforced chromium supported catalyst (e.g., the silicon-containing material, the amount of silica added (e.g., 10-50 wt. %), the chromium supported catalyst, and the conditions under which the silica-reinforced chromium supported catalyst is formed, among others) are independently described herein and these features can be combined in any combination to further describe the disclosed processes to produce a silica-reinforced chromium supported catalyst. Moreover, additional process steps can be performed before, during, and/or after any of the steps in any of the processes disclosed herein, and can be utilized without limitation and in any combination to further describe the processes for producing a silica-reinforced chromium supported catalyst, unless stated otherwise. Further, any silica-reinforced chromium supported catalysts produced in accordance with the disclosed processes are within the scope of this disclosure and are encompassed herein.

Optionally, a solvent (e.g., an alcohol solvent) can used to produce the silica-reinforced chromium supported catalyst. In such circumstances, the silicon-containing material, the chromium supported catalyst, and a solvent can be combined in any order or sequence. For example, the silicon-containing material can be combined first with the chromium supported catalyst, followed by the solvent. Alternatively, the silicon-containing material can be combined first with the solvent, followed by the chromium supported catalyst. The components in the combining step can be contacted or combined by any suitable means, such as by mixing or slurrying the components. The addition of the silica-containing material to form the silica-reinforced chromium supported catalyst can be conducted at any suitable temperature and for any suitable period of time. Typical temperatures and time periods are the same as those disclosed herein for the addition of the silicon-containing material to form the silica-reinforced solid support.

Any suitable silica-based chromium supported catalyst (preformed silica-based chromium supported catalyst, and typically dried) can be used. Numerous commercially-available grades of chromium catalyst, supported on various silica-based solid oxide supports, can be impregnated with additional silica as disclosed herein. Often, the chromium supported catalyst can comprise chromium/silica, chromium/silica-titania, chromium/silica-titania-magnesia, chromium/silica-alumina, and the like, or any combination thereof. In one aspect, the chromium supported catalyst can comprise chromium/silica, while in another aspect, the chromium supported catalyst can comprise chromium/silica-titania. In yet another aspect, the chromium supported catalyst can comprise chromium/silica-titania-magnesia, or alternatively, chromium/silica-alumina.

The processes disclosed herein can include a step of drying the silica-reinforced chromium supported catalyst. Any method or technique for drying can be used, such as the drying techniques disclosed hereinabove (e.g., spray drying) in relation to the silica-reinforced solid supports.

In various aspects encompassed herein, the silica-reinforced chromium supported catalyst can be subjected to a thermal treatment step (often referred to as a calcining or activation step). The thermal treatment (or calcination or activation) process can be conducted at a variety of temperatures and time periods, which are generally selected to convert all or a portion of the chromium to hexavalent chromium. Often, the thermal treatment is performed in an oxidizing atmosphere, but this is not a requirement. Activated silica-reinforced chromium supported catalysts produced by such thermal treatment processes also are encompassed by this invention.

In an aspect, the processes to form silica-reinforced solid supports, as described above, can further comprises a step of contacting the silica-reinforced solid support with a chromium-containing compound—representative and non-limiting examples of the chromium-compound compound include chromium (III) acetate, basic chromium (III) acetate, chromium (III) acetylacetonate, $Cr_2(SO_4)_3$, $Cr(NO_3)_3$, and $CrO_3$—while thermally treating to form an activated silica-reinforced chromium supported catalyst. In another aspect, a process to form a silica-reinforced chromium supported catalyst can comprise contacting or combining the solid oxide, the silicon-containing material, and the chromium-containing compound while thermally treating (activating) to form an activated silica-reinforced chromium supported catalyst. In yet another aspect, a process to form a silica-reinforced chromium supported catalyst can comprise contacting or combining a chromium supported catalyst and the silicon-containing material while thermally treating (activating) to form an activated silica-reinforced chromium supported catalyst. In these aspects, chromium and/or silica can be impregnated during the thermal treatment (or calcination or activation) process, which can be conducted at a variety of temperatures and time periods, and are generally selected to convert all or a portion of the chromium to hexavalent chromium. Activated silica-reinforced chromium supported catalysts produced by these processes (thermal treatment with concurrent chromium and/or silica addition) also are encompassed by this invention.

As noted above, thermal treatment (or calcining or activation) can be conducted at a variety of temperatures and time periods, which are generally selected to convert all or a portion of the chromium to hexavalent chromium. For instance, the thermal treatment step can be conducted at a peak temperature in a range from about 400° C. to about 1000° C.; alternatively, from about 500° C. to about 900° C.;

from about 500° C. to about 900° C.; alternatively, from about 600° C. to about 871° C.; alternatively, from about 550° C. to about 850° C.; alternatively, from about 700° C. to about 850° C.; alternatively, from about 725° C. to about 900° C.; alternatively, from about 725° C. to about 871° C.; alternatively, from about 725° C. to about 850° C.; alternatively, from about 750° C. to about 871° C.; or alternatively, from about 750° C. to about 850° C. In these and other aspects, these temperature ranges also are meant to encompass circumstances where the activation step is conducted at a series of different temperatures (e.g., an initial temperature, a peak temperature), instead of at a single fixed temperature, falling within the respective ranges. For instance, the activation step can start at an initial temperature, and subsequently, the temperature of the activation step can be increased to the peak temperature, for example, a peak temperature in a range from about 550° C. to about 850° C., or from about 725° C. to about 900° C.

The duration of the thermal treatment step is not limited to any particular period of time. Hence, this thermal treatment step can be conducted, for example, in a time period ranging from as little as 1 minute to as long as 12-24 hours, or more. The appropriate activation time can depend upon, for example, the initial/peak temperature, among other variables. Generally, however, the activation step can be conducted in a time period that can be in a range from about 1 minute to about 24 hours, such as, for example, from about 30 minutes to about 8 hours, from about 1 hour to about 12 hours, from about 2 hours to about 12 hours, from about 3 hours to about 10 hours, or from about 5 hours to about 10 hours.

In particular aspects of this invention, there can be substantially no VOC's (volatile organic compounds) emitted during the thermal treatment (calcination/activation) step. For instance, there can be substantially no VOC's emitted during the thermal treatment step when the silicate oligomer is completely hydrolyzed. Thus, in accordance with certain aspects of this invention, the silica-reinforced chromium supported catalyst (or activated silica-reinforced chromium supported catalyst) can contain less than or equal to about 5 wt. % carbon, less than or equal to about 3 wt. % carbon, or less than or equal to about 2 wt. % carbon, and in further aspects, less than or equal to about 1 wt. % carbon, less than or equal to about 0.5 wt. % carbon, or less than or equal to about 0.25 wt. % carbon. These weight percentages are based on the amount of carbon relative to the total weight of the respective catalyst.

Any of the silica-reinforced chromium supported catalysts produced by any of the processes disclosed herein can be characterized by any combination of properties of the silica-reinforced chromium supported catalyst disclosed herein: total pore volume, micropore pore volume, total BET surface area, micropore BET surface area, average (d50) particle size, amount of carbon, amount of chromium, and/or amount of added silica. For example, the silica-reinforced chromium supported catalysts produced by the disclosed processes can contain from about 0.1 to about 15 wt. % chromium and be characterized by a total pore volume of at least about 0.8 mL/g, a total BET surface area of at least about 200 m$^2$/g, and a micropore BET surface area (<50 Å) that is from about 10% to about 60% of the total BET surface area; or alternatively, can contain from about 0.5 to about 5 wt. % chromium and be characterized by a total pore volume from about 1 to about 5 mL/g, a total BET surface area from about 250 to about 550 m$^2$/g, and a micropore BET surface area (<50 Å) that is from about 10 to about 50% of the total BET surface area.

Polymerization Processes

Silica-reinforced chromium supported catalysts of the present invention can be used to polymerize olefins to form homopolymers, copolymers, terpolymers, and the like.

One such process for polymerizing olefins can comprise contacting any (activated) silica-reinforced chromium supported catalyst disclosed herein (e.g., produced by any process disclosed herein) and an optional co-catalyst with an olefin monomer and an optional olefin comonomer in a polymerization reactor system under polymerization conditions to produce an olefin polymer.

The catalyst compositions and/or polymerization processes disclosed herein often can employ a co-catalyst. In some aspects, the co-catalyst can comprise a metal hydrocarbyl compound, examples of which include non-halide metal hydrocarbyl compounds, metal hydrocarbyl halide compounds, non-halide metal alkyl compounds, metal alkyl halide compounds, and so forth, and in which the metal can be any suitable metal, often a group 13 metal. Hence, the metal can be boron or aluminum in certain aspects of this invention, and the co-catalyst can comprise a boron hydrocarbyl or alkyl, or an aluminum hydrocarbyl or alkyl, as well as combinations thereof.

In one aspect, the co-catalyst can comprise an aluminoxane compound, an organoaluminum compound, or an organoboron compound, and this includes combinations of more than co-catalyst compound. Representative and non-limiting examples of aluminoxanes include methylaluminoxane, modified methylaluminoxane, ethylaluminoxane, n-propylaluminoxane, iso-propylaluminoxane, n-butylaluminoxane, t-butylaluminoxane, sec-butylaluminoxane, iso-butylaluminoxane, 1-pentylaluminoxane, 2-pentylaluminoxane, 3-pentylaluminoxane, isopentylaluminoxane, neopentylaluminoxane, and the like, or any combination thereof. Representative and non-limiting examples of organoaluminums include trimethylaluminum, triethylaluminum, tri-n-propylaluminum, tri-n-butylaluminum, tri-isobutylaluminum, tri-n-hexylaluminum, tri-n-octylaluminum, diisobutylaluminum hydride, diethylaluminum ethoxide, diethylaluminum chloride, and the like, or any combination thereof. Representative and non-limiting examples of organoborons include tri-n-butyl borane, tripropylborane, triethylborane, and the like, or any combination thereof. Co-catalysts that can be used in the catalyst compositions of this invention are not limited to the co-catalysts described above. Other suitable co-catalysts (such as organomagnesiums and organolithiums) are well known to those of skill in the art including, for example, those disclosed in U.S. Pat. Nos. 3,242,099, 4,794,096, 4,808,561, 5,576,259, 5,807,938, 5,919,983, 7,294,599 7,601,665, 7,884,163, 8,114,946, and 8,309,485, which are incorporated herein by reference in their entirety.

Unsaturated monomers that can be employed with catalyst compositions and polymerization processes of this invention typically can include olefin compounds having from 2 to 30 carbon atoms per molecule and having at least one olefinic double bond. This invention encompasses homopolymerization processes using a single olefin such as ethylene or propylene, as well as copolymerization, terpolymerization, etc., reactions using an olefin monomer with at least one different olefinic compound. For example, the resultant ethylene copolymers, terpolymers, etc., generally can contain a major amount of ethylene (>50 mole percent) and a minor amount of comonomer (<50 mole percent), though this is not a requirement. Comonomers that can be copolymerized with ethylene often can have from 3 to 20 carbon atoms, or from 3 to 10 carbon atoms, in their molecular chain.

Acyclic, cyclic, polycyclic, terminal (α), internal, linear, branched, substituted, unsubstituted, functionalized, and non-functionalized olefins can be employed in this invention. For example, typical unsaturated compounds that can be polymerized with the catalyst compositions of this invention can include, but are not limited to, ethylene, propylene, 1-butene, 2-butene, 3-methyl-1-butene, isobutylene, 1-pentene, 2-pentene, 3-methyl-1-pentene, 4-methyl-1-pentene, 1-hexene, 2-hexene, 3-hexene, 3-ethyl-1-hexene, 1-heptene, 2-heptene, 3-heptene, the four normal octenes (e.g., 1-octene), the four normal nonenes, the five normal decenes, and the like, or mixtures of two or more of these compounds. Cyclic and bicyclic olefins, including but not limited to, cyclopentene, cyclohexene, norbornylene, norbornadiene, and the like, also can be polymerized as described herein. Styrene can also be employed as a monomer in the present invention. In an aspect, the olefin monomer can comprise a $C_2$-$C_{20}$ olefin; alternatively, a $C_2$-$C_{20}$ alpha-olefin; alternatively, a $C_2$-$C_{10}$ olefin; alternatively, a $C_2$-$C_{10}$ alpha-olefin; alternatively, the olefin monomer can comprise ethylene; or alternatively, the olefin monomer can comprise propylene.

When a copolymer (or alternatively, a terpolymer) is desired, the olefin monomer and the olefin comonomer independently can comprise, for example, a $C_2$-$C_{20}$ alpha-olefin. In some aspects, the olefin monomer can comprise ethylene or propylene, which is copolymerized with at least one comonomer (e.g., a $C_2$-$C_{20}$ alpha-olefin, a $C_3$-$C_{20}$ alpha-olefin, etc.). According to one aspect of this invention, the olefin monomer used in the polymerization process can comprise ethylene. In this aspect, examples of suitable olefin comonomers can include, but are not limited to, propylene, 1-butene, 2-butene, 3-methyl-1-butene, isobutylene, 1-pentene, 2-pentene, 3-methyl-1-pentene, 4-methyl-1-pentene, 1-hexene, 2-hexene, 3-ethyl-1-hexene, 1-heptene, 2-heptene, 3-heptene, 1-octene, 1-decene, styrene, and the like, or combinations thereof. According to another aspect of the present invention, the olefin monomer can comprise ethylene, and the comonomer can comprise a $C_3$-$C_{10}$ alpha-olefin; alternatively, the comonomer can comprise 1-butene, 1-pentene, 1-hexene, 1-octene, 1-decene, styrene, or any combination thereof; alternatively, the comonomer can comprise 1-butene, 1-hexene, 1-octene, or any combination thereof; alternatively, the comonomer can comprise 1-butene; alternatively, the comonomer can comprise 1-hexene; or alternatively, the comonomer can comprise 1-octene.

Generally, the amount of comonomer introduced into a polymerization reactor system to produce a copolymer can be from about 0.01 to about 50 weight percent, based on the total weight of the monomer and comonomer. According to another aspect of the present invention, the amount of comonomer introduced into a polymerization reactor system can be from about 0.01 to about 40 weight percent comonomer, based on the total weight of the monomer and comonomer, or alternatively, from about 0.1 to about 35 weight percent comonomer, or from about 0.5 to about 20 weight percent comonomer.

While not intending to be bound by this theory, where branched, substituted, or functionalized olefins are used as reactants, it is believed that a steric hindrance can impede and/or slow the polymerization process. Thus, branched and/or cyclic portion(s) of the olefin removed somewhat from the carbon-carbon double bond would not be expected to hinder the reaction in the way that the same olefin substituents situated more proximate to the carbon-carbon double bond might.

According to one aspect of the present invention, at least one monomer/reactant can be ethylene (or propylene), so the polymerization reaction can be a homopolymerization involving only ethylene (or propylene), or a copolymerization with a different acyclic, cyclic, terminal, internal, linear, branched, substituted, or unsubstituted olefin. In addition, the catalyst compositions of this invention can be used in the polymerization of diolefin compounds including, but not limited to, 1,3-butadiene, isoprene, 1,4-pentadiene, and 1,5-hexadiene.

The silica-reinforced chromium supported catalysts of the present invention are intended for any olefin polymerization method using various types of polymerization reactor systems and reactors. The polymerization reactor system can include any polymerization reactor capable of polymerizing olefin monomers and comonomers (one or more than one comonomer) to produce homopolymers, copolymers, terpolymers, and the like. The various types of reactors include those that can be referred to as a batch reactor, slurry reactor, gas-phase reactor, solution reactor, high pressure reactor, tubular reactor, autoclave reactor, and the like, or combinations thereof. The polymerization conditions for the various reactor types are well known to those of skill in the art. Gas phase reactors can comprise fluidized bed reactors or staged horizontal reactors. Slurry reactors can comprise vertical or horizontal loops. High pressure reactors can comprise autoclave or tubular reactors. These reactor types generally can be operated continuously. Continuous processes can use intermittent or continuous polymer product discharge. Polymerization reactor systems and processes also can include partial or full direct recycle of unreacted monomer, unreacted comonomer, and/or diluent.

Polymerization reactor systems of the present invention can comprise one type of reactor in a system or multiple reactors of the same or different type (e.g., a single reactor, dual reactor, more than two reactors). For instance, the polymerization reactor system can comprise a solution reactor, a gas-phase reactor, a slurry reactor, or a combination of two or more of these reactors. Production of polymers in multiple reactors can include several stages in at least two separate polymerization reactors interconnected by a transfer device making it possible to transfer the polymer resulting from the first polymerization reactor into the second reactor. The polymerization conditions in one of the reactors can be different from the operating conditions of the other reactor(s). Alternatively, polymerization in multiple reactors can include the manual transfer of polymer from one reactor to subsequent reactors for continued polymerization. Multiple reactor systems can include any combination including, but not limited to, multiple loop reactors, multiple gas phase reactors, a combination of loop and gas phase reactors, multiple high pressure reactors, or a combination of high pressure with loop and/or gas phase reactors. The multiple reactors can be operated in series, in parallel, or both. Accordingly, the present invention encompasses polymerization reactor systems comprising a single reactor, comprising two reactors, and comprising more than two reactors. The polymerization reactor system can comprise a slurry reactor, a gas-phase reactor, a solution reactor, in certain aspects of this invention, as well as multi-reactor combinations thereof.

According to one aspect, the polymerization reactor system can comprise at least one loop slurry reactor, e.g., comprising vertical or horizontal loops. Monomer, diluent, catalyst, and optional comonomer can be continuously fed to a loop reactor where polymerization occurs. Generally, continuous processes can comprise the continuous introduction of monomer/comonomer, a catalyst, and a diluent into a polymerization reactor and the continuous removal from this reactor of a suspension comprising polymer particles and the diluent. Reactor effluent can be flashed to remove the solid polymer from the liquids that comprise the diluent, monomer and/or comonomer. Various technologies can be used for this separation step including, but not limited to, flashing that can include any combination of heat addition and pressure reduction, separation by cyclonic action in either a cyclone or hydrocyclone, or separation by centrifugation.

A typical slurry polymerization process (also known as the particle form process) is disclosed, for example, in U.S. Pat. Nos. 3,248,179, 4,501,885, 5,565,175, 5,575,979, 6,239,235, 6,262,191, 6,833,415, and 8,822,608, each of which is incorporated herein by reference in its entirety.

Suitable diluents used in slurry polymerization include, but are not limited to, the monomer being polymerized and hydrocarbons that are liquids under reaction conditions. Examples of suitable diluents include, but are not limited to, hydrocarbons such as propane, cyclohexane, isobutane, n-butane, n-pentane, isopentane, neopentane, and n-hexane. Some loop polymerization reactions can occur under bulk conditions where no diluent is used, such as can be employed in the bulk polymerization of propylene to form polypropylene homopolymers.

According to yet another aspect, the polymerization reactor system can comprise at least one gas phase reactor (e.g., a fluidized bed reactor). Such reactor systems can employ a continuous recycle stream containing one or more monomers continuously cycled through a fluidized bed in the presence of the catalyst under polymerization conditions. A recycle stream can be withdrawn from the fluidized bed and recycled back into the reactor. Simultaneously, polymer product can be withdrawn from the reactor and new or fresh monomer can be added to replace the polymerized monomer. Such gas phase reactors can comprise a process for multi-step gas-phase polymerization of olefins, in which olefins are polymerized in the gaseous phase in at least two independent gas-phase polymerization zones while feeding a catalyst-containing polymer formed in a first polymerization zone to a second polymerization zone. One type of gas phase reactor is disclosed in U.S. Pat. Nos. 5,352,749, 4,588,790, 5,436,304, 7,531,606, and 7,598,327, each of which is incorporated by reference in its entirety herein.

According to still another aspect, the polymerization reactor system can comprise a high pressure polymerization reactor, e.g., can comprise a tubular reactor or an autoclave reactor. Tubular reactors can have several zones where fresh monomer, initiators, or catalysts are added. Monomer can be entrained in an inert gaseous stream and introduced at one zone of the reactor. Initiators, catalysts, and/or catalyst components can be entrained in a gaseous stream and introduced at another zone of the reactor. The gas streams can be intermixed for polymerization. Heat and pressure can be employed appropriately in such high pressure polymerization reactors to obtain optimal polymerization reaction conditions.

According to yet another aspect, the polymerization reactor system can comprise a solution polymerization reactor, wherein the monomer/comonomer can be contacted with the catalyst composition by suitable stirring or other means. A carrier comprising an inert organic diluent or excess monomer can be employed. If desired, the monomer/comonomer can be brought in the vapor phase into contact with the catalytic reaction product, in the presence or absence of liquid material. The polymerization zone can be maintained at temperatures (e.g., up to between 150° C. and 180° C.) and pressures that will result in the formation of a solution of the polymer in a reaction medium. Agitation can be employed to obtain better temperature control and to maintain uniform polymerization mixtures throughout the polymerization zone. Adequate means are utilized for dissipating the exothermic heat of polymerization.

In some aspects, the polymerization reactor system can comprise any combination of a raw material feed system, a feed system for catalyst and/or catalyst components, and/or a polymer recovery system, including continuous systems. In other aspects, suitable reactor systems can comprise systems for feedstock purification, catalyst storage and preparation, extrusion, reactor cooling, polymer recovery, fractionation, recycle, storage, loadout, laboratory analysis, and process control.

Polymerization conditions that can be monitored, adjusted, and/or controlled for efficiency and to provide desired polymer properties can include, but are not limited to, reactor temperature, reactor pressure, catalyst system flow rate into the reactor, monomer flow rate (and comonomer, if employed) into the reactor, monomer concentration in the reactor, olefin polymer output rate, recycle rate, hydrogen flow rate (if employed), reactor cooling status, and the like. Polymerization temperature can affect catalyst productivity, polymer molecular weight, and molecular weight distribution. A suitable polymerization temperature can be any temperature below the de-polymerization temperature according to the Gibbs Free energy equation. Typically, this includes from about 60° C. to about 280° C., for example, from about 60° C. to about 185° C., from about 60° C. to about 115° C., or from about 130° C. to about 180° C., depending upon the type of polymerization reactor, the polymer grade, and so forth. In some reactor systems, the polymerization reactor temperature generally can be within a range from about 70° C. to about 110° C., or from about 125° C. to about 175° C. Various polymerization conditions can be held substantially constant, for example, for the production of a particular grade of olefin polymer.

Suitable pressures will also vary according to the reactor and polymerization type. The pressure for liquid phase polymerizations in a loop reactor typically can be less than 1000 psig (6.9 MPa). The pressure for gas phase polymerization usually can be in the 200 psig to 500 psig range (1.4 MPa to 3.4 MPa). High pressure polymerization in tubular or autoclave reactors generally can be conducted at about 20,000 psig to 75,000 psig (138 MPa to 517 MPa). Polymerization reactors can also be operated in a supercritical region occurring at generally higher temperatures and pressures (for instance, above 92° C. and 700 psig (4.83 MPa)). Operation above the critical point of a pressure/temperature diagram (supercritical phase) can offer advantages to the polymerization reaction process.

Aspects of this invention also are directed to olefin polymerization processes conducted in the absence of added hydrogen. An olefin polymerization process of this invention can comprise contacting a silica-reinforced chromium supported catalyst and an optional co-catalyst with an olefin monomer and optionally an olefin comonomer in a polymerization reactor system under polymerization conditions to produce an olefin polymer, and wherein the polymerization process is conducted in the absence of added hydrogen (no hydrogen is added to the polymerization reactor system). As one of ordinary skill in the art would recognize, hydrogen can be generated in-situ by certain catalyst systems in various olefin polymerization processes, and the amount generated can vary depending upon the specific catalyst components employed, the type of polymerization process used, the polymerization reaction conditions utilized, and so forth.

In other aspects, it may be desirable to conduct the polymerization process in the presence of a certain amount of added hydrogen. Accordingly, an olefin polymerization process of this invention can comprise contacting a silica-reinforced chromium supported catalyst and an optional co-catalyst with an olefin monomer and optionally an olefin comonomer in a polymerization reactor system under polymerization conditions to produce an olefin polymer, wherein the polymerization process is conducted in the presence of added hydrogen (hydrogen is added to the polymerization reactor system). For example, the ratio of hydrogen to the olefin monomer in the polymerization process can be controlled, often by the feed ratio of hydrogen to the olefin monomer entering the reactor. The amount of hydrogen added (based on the amount of olefin monomer) to the process can be controlled at a molar percentage which generally falls within a range from about 0.05 to about 20 mole %, from about 0.1 to about 15 mole %, from about 0.25 to about 10 mole %, or from about 0.5 to about 10 mole %. In some aspects of this invention, the feed or reactant ratio of hydrogen to olefin monomer can be maintained substantially constant during the polymerization run for a particular polymer grade. That is, the hydrogen:olefin monomer ratio can be selected at a particular ratio, and maintained at the ratio to within about +/−25% during the polymerization run. Further, the addition of comonomer (or comonomers) can be, and generally is, substantially constant throughout the polymerization run for a particular polymer grade.

However, in other aspects, it is contemplated that monomer, comonomer (or comonomers), and/or hydrogen can be periodically pulsed to the reactor, for instance, in a manner similar to that employed in U.S. Pat. No. 5,739,220 and U.S. Patent Publication No. 2004/0059070, the disclosures of which are incorporated herein by reference in their entirety.

The concentration of the reactants entering the polymerization reactor system can be controlled to produce resins with certain physical and mechanical properties. The proposed end-use product that will be formed by the polymer resin and the method of forming that product ultimately can determine the desired polymer properties and attributes. Mechanical properties include tensile, flexural, impact, creep, stress relaxation, and hardness tests. Physical properties include density, molecular weight, molecular weight distribution, melting temperature, glass transition temperature, temperature melt of crystallization, density, stereoregularity, crack growth, long chain branching, and rheological measurements.

This invention is also directed to, and encompasses, the polymers produced by any of the polymerization processes disclosed herein. Articles of manufacture can be formed from, and/or can comprise, the polymers produced in accordance with this invention.

Polymers and Articles

Olefin polymers encompassed herein can include any polymer produced from any olefin monomer and optional comonomer(s) described herein. For example, the olefin polymer can comprise an ethylene homopolymer, an ethylene copolymer (e.g., ethylene/α-olefin, ethylene/1-butene, ethylene/1-hexene, ethylene/1-octene, etc.), a propylene homopolymer, a propylene copolymer, an ethylene terpolymer, a propylene terpolymer, and the like, including any combinations thereof. In one aspect, the olefin polymer can be an ethylene/1-butene copolymer, an ethylene/1-hexene copolymer, or an ethylene/1-octene copolymer, while in another aspect, the olefin polymer can be an ethylene/1-hexene copolymer.

If the resultant polymer produced in accordance with the present invention is, for example, an ethylene polymer, its properties can be characterized by various analytical techniques known and used in the polyolefin industry. Articles of manufacture can be formed from, and/or can comprise, the olefin polymers (e.g., ethylene polymers) of this invention, whose typical properties are provided below.

Ethylene polymers produced in accordance with this invention can have a high load melt index (HLMI, $I_{21}$) of less than or equal to about 200, less than or equal to about 150, or less than or equal to about 100 g/10 min. Suitable ranges for the HLMI can include, but are not limited to, from 0 to about 150, from about 1 to about 100, from about 1 to about 80, from about 2 to about 80, from about 1 to about 60, from about 2 to about 60, from about 1 to about 40, from about 2 to about 40, from about 2 to about 30, or from about 1 to about 20 g/10 min.

Generally, the ethylene polymers can have a melt index (MI, $I_2$) of less than or equal to about 1, less than or equal to about 0.5, or less than or equal to about 0.3 g/10 min. Suitable non-limiting ranges for the MI, therefore, can include from 0 to about 0.5, from 0 to about 0.4, from 0 to about 0.3, or from 0 to about 0.2 g/10 min.

In an aspect, ethylene polymers described herein can have a ratio of $I_{21}/I_2$ (HLMI/MI) in a range from about 20 to about 200, from about 20 to about 150, from about 30 to about 150, from about 40 to about 150, or from about 40 to about 120. In another aspect, ethylene polymers described herein can have a ratio of $I_{21}/I_2$ in a range from about 25 to about 150, from about 50 to about 150, from about 45 to about 120, or from about 60 to about 120.

The densities of ethylene-based polymers produced using the silica-reinforced chromium supported catalysts and the processes disclosed herein often are greater than or equal to about 0.89 g/cm$^3$. In one aspect of this invention, the density of the ethylene polymer can be in a range from about 0.90 to about 0.97 g/cm$^3$. Yet, in another aspect, the density can be in a range from about 0.91 to about 0.96 g/cm$^3$, such as, for example, from about 0.92 to about 0.96 g/cm$^3$, from about 0.93 to about 0.955 g/cm$^3$, or from about 0.94 to about 0.955 g/cm$^3$.

In an aspect, ethylene polymers described herein can have a ratio of Mw/Mn, or the polydispersity index, of greater than or equal to about 5, greater than or equal to about 6, or greater than or equal to about 7. Often, the Mw/Mn can range up to about 30-40, therefore, non-limiting ranges for Mw/Mn include from about 5 to about 40, from about 5 to about 20, from about 5 to about 15, from about 7 to about 35, from about 7 to about 20, from about 7 to about 15, from about 7 to about 12, from about 8 to about 35, from about 8 to about 25, from about 8 to about 15, or from about 8 to about 12. Surprisingly, olefin polymers (e.g., ethylene polymers) produced using the silica-reinforced chromium supported catalysts and polymerization processes described herein can have a Mw/Mn greater (e.g., at least 2% greater, at least 3% greater, at least 10% greater, etc., and often up to 40-60% greater) than that of an olefin polymer produced by the same polymerization process using an otherwise identical chromium supported catalyst without the silica reinforcement. This comparison is conducted at the same polymerization conditions and with the same other catalyst features (same amount of catalyst, same amount of chromium, same total BET surface area, same polymerization temperature, etc.). Hence, the only difference is the chromium catalyst with silica reinforcement, as compared to a chromium catalyst without silica reinforcement (see Examples 1-5 below).

Typically, the ethylene polymers described herein can have a ratio of Mz/Mw that can range from about 5 to about 10, from about 5 to about 9, from about 5 to about 8, from about 5 to about 7.5, from about 6 to about 10, from about 6 to about 8, or from about 6 to about 7.5. While not limited thereto, the Mw of the ethylene polymers described herein often ranges from about 100 to about 500 kg/mol; alternatively, from about 150 to about 350 kg/mol; alternatively, from about 170 to about 350 kg/mol; alternatively, from about 180 to about 300 kg/mol; alternatively, from about 200 to about 320 kg/mol; or alternatively, from about 200 to about 300 kg/mol. Likewise, while not limited thereto, the Mz of the ethylene polymers described herein often ranges from about 1000 to about 2500 kg/mol; alternatively, from about 1400 to about 2500 kg/mol; or alternatively, from about 1400 to about 2200 kg/mol. Surprisingly, olefin polymers (e.g., ethylene polymers) produced using the silica-reinforced chromium supported catalysts and polymerization processes described herein can have a Mw (or Mz) greater (e.g., at least 10% greater, at least 20% greater, at least 25% greater, etc., and often up to 50-75% greater) than that of an olefin polymer produced by the same polymerization process using an otherwise identical chromium supported catalyst without the silica reinforcement. This comparison is conducted at the same polymerization conditions and with the same other catalyst features (same amount of catalyst, same amount of chromium, same total BET surface area, same polymerization temperature, etc.). Hence, the only difference is the chromium catalyst with silica reinforcement, as compared to a chromium catalyst without silica reinforcement (see Examples 1-5 below).

The ethylene polymers described herein generally contain at least about 1 long chain branch (LCB) per million total carbon atoms. Illustrative and non-limiting ranges for the LCB content can include from about 1 to about 10, from about 1 to about 8, from about 1 to about 5, from about 2 to about 10, from about 2 to about 8, from about 2 to about 5, from about 3 to about 10, from about 3 to about 8, or from about 3 to about 5, LCB per million total carbon atoms. Surprisingly, olefin polymers (e.g., ethylene polymers) produced using the silica-reinforced chromium supported catalysts and polymerization processes described herein can have more LCB (per million total carbon atoms) (e.g., at least 0.5 more LCB, at least 1 more LCB, at least 1.5 more LCB, etc., and often up to 4-6 LCB more) than that of an olefin polymer produced by the same polymerization process using an otherwise identical chromium supported catalyst without the silica reinforcement. This comparison is conducted at the same polymerization conditions and with the same other catalyst features (same amount of catalyst, same amount of chromium, same total BET surface area, same polymerization temperature, etc.). Hence, the only difference is the chromium catalyst with silica reinforcement, as compared to a chromium catalyst without silica reinforcement (see Examples 1-5 below). An illustrative and non-limiting example of an ethylene polymer (e.g., an ethylene homopolymer or an ethylene/α-olefin copolymer) of the present invention can have a melt index (MI, $I_2$) in a range from 0 to about 0.5 g/10 min, a ratio of $I_{21}/I_2$ (HLMI/MI) in a range from about 30 to about 150, and a Mw in a range from about 150 to about 350 kg/mol. An illustrative and non-limiting example of another ethylene polymer of the present invention can have these MI, HLMI/MI, and Mw characteristics, and a ratio of Mw/Mn in a range from about 5 to about 15, and/or from about 1 to about 10 LCB per million carbon atoms. In further aspects, these illustrative and non-limiting examples of ethylene polymers also can have any combination of any of following MI, HLMI/MI, Mw, Mw/Mn, and LCB properties: a MI from 0 to about 0.4, from 0 to about 0.3, or from 0 to about 0.2 g/10 min; and/or a HLMI/MI from about 40 to about 150, from about 40 to about 120, from about 45 to about 120, from about 50 to about 150, or from about 60 to about 120; and/or a Mw from about 170 to about 350, from about 180 to about 300, from about 200 to about 320, or from about 200 to about 300 kg/mol; and/or a Mw/Mn from about 7 to about 15, from about 7 to about 12, from about 8 to about 15, or from about 8 to about 12; and/or from about 1 to about 8, from about 2 to about 8, from about 2 to about 5, from about 3 to about 10, from about 3 to about 8, or from about 3 to about 5 LCB per million total carbon atoms.

These illustrative and non-limiting examples of ethylene polymers (e.g., ethylene homopolymers or ethylene/α-olefin copolymers) consistent with the present invention also can have any of the HLMI, density, Mz, and Mz/Mw properties disclosed herein and in any combination, unless indicated otherwise.

Polymers of ethylene, whether homopolymers, copolymers, and so forth, can be formed into various articles of manufacture. Articles which can comprise polymers of this invention include, but are not limited to, an agricultural film, an automobile part, a bottle, a drum, a fiber or fabric, a food packaging film or container, a food service article, a fuel tank, a geomembrane, a household container, a liner, a molded product, a medical device or material, a pipe, a sheet or tape, a toy, and the like. Various processes can be employed to form these articles. Non-limiting examples of these processes include injection molding, blow molding, rotational molding, film extrusion, sheet extrusion, profile extrusion, thermoforming, and the like. Additionally, additives and modifiers are often added to these polymers in order to provide beneficial polymer processing or end-use product attributes. Such processes and materials are described in *Modern Plastics Encyclopedia*, Mid-November 1995 Issue, Vol. 72, No. 12; and *Film Extrusion Manual—Process, Materials, Properties*, TAPPI Press, 1992; the disclosures of which are incorporated herein by reference in their entirety.

Also contemplated herein is a method for forming or preparing an article of manufacture comprising a polymer produced by any of the polymerization processes disclosed herein. For instance, a method can comprise (i) contacting a silica-reinforced chromium supported catalyst (e.g., produced as described herein) and an optional co-catalyst with an olefin monomer and an optional olefin comonomer under polymerization conditions in a polymerization reactor system to produce an olefin polymer; and (ii) forming an article of manufacture comprising the olefin polymer (e.g., having any of the polymer properties disclosed herein). The forming step can comprise blending, melt processing, extruding, molding, or thermoforming, and the like, including combinations thereof.

EXAMPLES

The invention is further illustrated by the following examples, which are not to be construed in any way as imposing limitations to the scope of this invention. Various other aspects, modifications, and equivalents thereof, which after reading the description herein, can suggest themselves to one of ordinary skill in the art without departing from the spirit of the present invention or the scope of the appended claims.

Melt index (MI, $I_2$, g/10 min) was determined in accordance with ASTM D1238 at 190° C. with a 2.16 kg weight. High load melt index (HLMI, $I_{21}$, g/10 min) was determined in accordance with ASTM D1238 at 190° C. with a 21.6 kg weight.

Molecular weights and molecular weight distributions were obtained from a Waters 150 CV Plus or a Polymer Labs PL220 Gel Permeation Chromatograph using trichlorobenzene as the solvent with a flow rate of 1 mL/min at a temperature of 140° C. BHT at a concentration of 0.5 g/L was used as a stabilizer in the solvent. An injection volume of 220 µL was used with a nominal polymer concentration of 6.5 mg/3.5 mL (at room temperature). The column set consisted of two Waters Styragel HT 6E mixed-bed or three or four PLGel Mixed A columns plus a guard column. A broad-standard integral method of universal calibration was used based on a Chevron Phillips Chemical Company HDPE polyethylene resin, MARLEX® BHB 5003, as the broad linear PE standard. Parameter values used in the Mark-Houwink equation ($[\eta]=K \cdot M^a$) for polyethylene were $K=39.5(10^{-3})$ mL/g and a=0.726. Mn is the number-average molecular weight, Mw is the weight-average molecular weight, and Mz is the z-average molecular weight.

Samples for viscosity measurements were compression molded at 182° C. for a total of three minutes. The samples were allowed to melt at a relatively low pressure for one minute and then subjected to a high molding pressure for an additional two minutes. The molded samples were then quenched in a cold (room temperature) press. Subsequently, 2 mm×25.4 mm diameter disks were stamped out of the molded slabs for rheological characterization. Fluff samples were stabilized with 0.1 wt. % BHT dispersed in acetone and then vacuum dried before molding.

Small-strain oscillatory shear measurements were performed at 190° C. on a Rheometrics Inc. RMS-800 or ARES rheometer using parallel-plate geometry over an angular frequency range of 0.03-100 rad/s. The test chamber of the rheometer was blanketed in nitrogen in order to minimize polymer degradation. The rheometer was preheated to the initial temperature of the study. Upon sample loading and after oven thermal equilibration, the specimens were squeezed between the plates to a 1.6 mm thickness and the excess was trimmed. A total of approximately 8 minutes elapsed between the time the sample was inserted between the plates and the time the frequency sweep was started.

Strains were generally maintained at a single value throughout a frequency sweep, but larger strain values were used for low viscosity samples to maintain a measurable torque. Smaller strain values were used for high viscosity samples to avoid overloading the torque transducer and to keep within the linear viscoelastic limits of the sample. The instrument automatically reduced the strain at high frequencies if necessary to keep from overloading the torque transducer. The complex viscosity $|\eta^*|$ versus frequency (w) data were then curve fitted using the modified three parameter Carreau-Yasuda (CY) empirical model to obtain the zero shear viscosity—$\eta_0$, characteristic viscous relaxation time—$\tau_\eta$, and the breadth parameter—a (CY-a parameter). The simplified Carreau-Yasuda (CY) empirical model is as follows.

$$|\eta^*(\omega)| = \frac{\eta_0}{[1+(\tau_\eta \omega)^a]^{(1-n)/a}},$$

wherein: $|\eta^*(\omega)|$=magnitude of complex shear viscosity;
$\eta_0$=zero shear viscosity;
$\tau_\eta$=viscous relaxation time (Tau(q));
a="breadth" parameter (CY-a parameter);
n=fixes the final power law slope, fixed at 2/11; and
$\omega$=angular frequency of oscillatory shearing deformation.

Details of the significance and interpretation of the CY model and derived parameters can be found in: C. A. Hieber and H. H. Chiang, *Rheol. Acta,* 28, 321 (1989); C. A. Hieber and H. H. Chiang, *Polym. Eng. Sci.,* 32, 931 (1992); and R. B. Bird, R. C. Armstrong and O. Hasseger, *Dynamics of Polymeric Liquids, Volume 1, Fluid Mechanics,* 2nd Edition, John Wiley & Sons (1987); each of which is incorporated herein by reference in its entirety.

Melt rheology is very sensitive to the effects of long chain branches (LCB), even at trace levels. Chains containing LCB entangle in the melt phase, profoundly increasing the low shear melt viscosity. Therefore, the most sensitive method of gauging LCB is to look for increases in low shear melt viscosity that go beyond what would be expected from linear polymers of the same molecular weight. Like many other polymers, PE having no LCB follows a log dependence of melt viscosity on molecular weight. If the log of the extrapolated zero-shear viscosity (designated $\eta_0$, determined from the Carreau-Yasuda model, described hereinabove) is plotted against the log of the weight-average molecular weight (Mw), a straight line is obtained having a slope of 3.4. The presence of LCB is indicated by deviations from this "power law" or Arnett line. The effect of LCB on viscosity is more pronounced at higher molecular weight than at lower molecular weight, because entanglements are less easily overcome during flow. This relationship was defined by Janzen and Colby, giving rise to curved contour lines for given LCB levels (*J. Mol. Struct.,* 485/486, 569-584 (1999)). See also U.S. Pat. No. 8,114,946; J. Phys. Chem. 1980, 84, 649; and Y. Yu, D. C. Rohlfing, G. R Hawley, and P. J. DesLauriers, *Polymer Preprints,* 44, 49-50 (2003). These references are incorporated herein by reference in their entirety. Due to the effect of the breadth of the molecular weight distribution, a small correction according to Yau (*Polymer,* 2007, 48, 2362-2370, incorporated herein by reference in its entirety) was applied.

For catalyst characterization, about 0.2 g of sample were degassed in a physisorption tube, using a Micromeritics SmartVacPrep. To prevent portions of the fine particles from boiling up to a region of the sample tube not in the heated zone, the pressure was reduced gradually, and the temperature was increased stepwise. The pressure was initially reduced from ambient to 5 mm Hg, at a controlled rate of 5 mm Hg/s, while holding the samples at 30° C. After reaching sufficient vacuum (~0.09 mm Hg), the temperature was increased to 50° C., then to 70° C., then to 90° C., with each temperature step held for 30 minutes. The last step held the temperature at 300° C. for 12 hours, with the final vacuum reaching a pressure of about 1 milliTorr. After cooling to ambient, the samples were backfilled with nitrogen and analyzed on a Micromeritics TriStar II nitrogen physisorption instrument. Approximately 64 adsorption points were collected to construct an isotherm, and software packages included with the instrument were used to determine surface areas, total pore volumes, and to generate pore size distribution curves. Surface areas were determined using the BET method (Brunauer, *J. Am Chem. Soc.*, 1938, 60, 309), from adsorption isotherm points having P/Po values from 0.0 to 0.2. Pore volume values were calculated from the isotherm point having a P/Po value closest to 0.982. Pore size distributions were generated from desorption isotherm data using the BJH method (*J. Am. Chem. Soc.*, 1951, 73, 373), with thickness curves generated using the Halsey equation (*J. Chem. Phys.*, 1948, 16, 931). These references are incorporated herein by reference in their entirety.

Catalyst Examples 1-5

Silica-Reinforced Chromium Supported Catalysts

The polymerization-grade silica used in this study was supplied by Philadelphia Quartz Co. under the trade name of MS3050. The oligomers of ethyl silicate were obtained from Evonik Corp. under the trade name Silbond 40 condensed tetraethyl orthosilicate, described as having a molecular weight of around 800 (and a wide distribution of oligomers, including ethyl silicate monomer as well as a few very large molecules, e.g., larger than pentamers or hexamers). Methanol solutions were made to contain the desired amount of silicate, and enough dissolved basic chromium acetate to equal 1 wt. % of the final catalyst. The volume of each solution was set to reach incipient wetness when added to the silica (about 3.5 mL/g) at room temperature. After the simultaneous impregnation of chromium acetate and the silicate oligomers, the product was stirred for about 2 minutes, and then the silica-reinforced chromium catalysts were dried in a vacuum oven at 100° C. overnight. The added silica content was determined as silica added as Silbond 40, divided by the total weight of the silica-reinforced chromium/silica catalyst. While not tested, it was expected that at least 99 wt. % of the chromium was present in an oxidation state of three or less for each catalyst, prior to activation, and that each catalyst contained less than 5 wt. % carbon.

To activate the silica-reinforced chromium/silica catalysts of Examples 1-5, approximately 10 g of the dried catalyst was added to a 2-inch diameter quartz tube containing a coarse sintered glass frit (gas distribution plate) at the bottom. An air stream, dried through 13× molecular sieve, was added at the bottom of the tube so that it passed up through the frit and fluidized the catalyst. The air flow was initially set at 0.05 ft/s at 25° C., and remained constant thereafter. The tube was placed in a furnace and the temperature raised over 1.5 h to 800° C., where it was held for three hours. Afterward, the active catalyst containing 1 wt. % Cr(VI) was flushed with dry nitrogen at 25° C. for 15 minutes and then captured in a sealed flask.

Catalyst Example 1 contained no added silica and had a total BET surface area of 440 m$^2$/g and a total pore volume of 2.7 mL/g. Catalyst Examples 2-5 were prepared with the addition of from 13-33 wt. % of silica (based on the total weight of the silica-reinforced catalyst), as summarized in Table I. The addition of silicate oligomers had little effect on the total BET surface areas of the silica-reinforced catalysts of Examples 2-5. However, Table I demonstrates that the total pore volume decreased substantially, down to less than half of the original pore volume due to the deposition of additional silica. These two variables are plotted in FIG. 1 as a function of added silica (wt. %).

Also listed in Table I are the expected surface area and pore volume if the added silica contributed weight but no surface area and no pore volume (other than its skeletal volume, which was subtracted). Unexpectedly, the observed surface area is significantly higher than the predicted surface area, which indicates that the added silica is also contributing some surface area to the catalyst. The calculated surface area contributions of the added silica are listed in the next line, which are all less than the parent silica. The situation is reversed for the pore volume, because the expected pore volume is much higher than the observed pore volume. This indicates that the added silica may be blocking some of the original pores. Calculations of the pore volume contributions of the added silica also are shown. They are all negative, indicating that the added silica is actually removing pore volume, as would be expected if the added silica is blocking pores.

Figure 2:
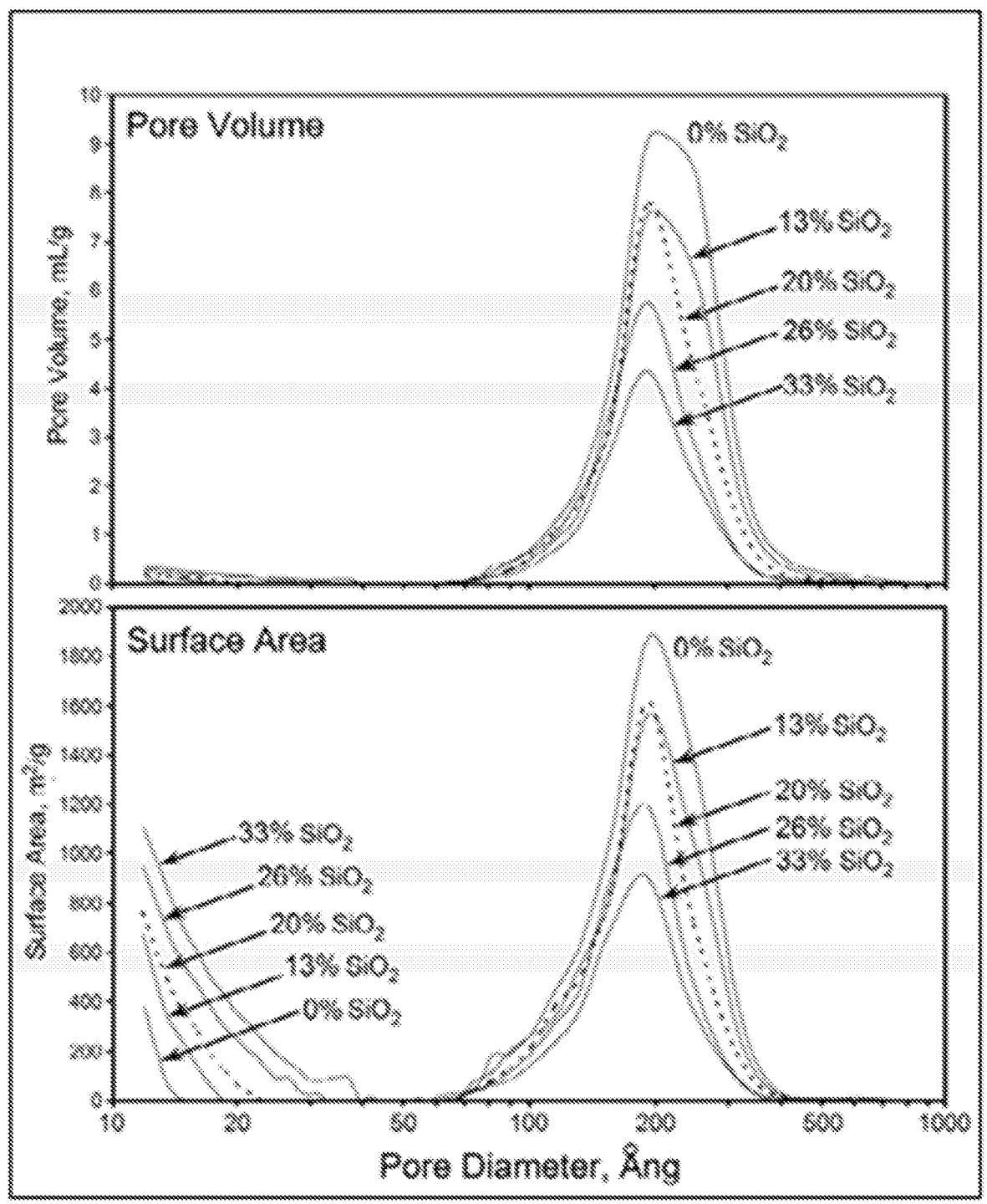
FIG. 2 presents plots of the pore volume and surface area distributions as a function of pore diameter for the catalysts of Examples 1-5 containing from zero to 33 wt. % added silica.

FIG. 2 shows the pore volume and surface area distributions as a function of pore diameter (Å). The plot confirms the results discussed above, and it makes clear that the simple average pore diameter shown in Table I is not useful for describing silica-reinforced catalysts. Of particular interest, the pore volume of the catalyst of Example 1 is almost entirely located in a single meso-pore peak centered about 200 Å. As the silicate oligomers are added, this peak shrinks and shifts slightly to lower diameters. This suggests that while some of the smaller oligomers coated pore walls, a few of the larger oligomers may be blocking pores. A small amount of pore volume is also introduced in the micro-pore range due to the silica deposition: from 1% to over 8% of pore volume of the silica-reinforced catalysts of Examples 2-5 is in the micro-pores (see Table II). The total pore volumes of the silica-reinforced catalysts of Examples 2-5 are in the 1.2-2.2 mL/g range.

Referring now to the surface area plot in the lower part of FIG. 2, the surface area of the catalyst of Example 1 is almost entirely concentrated into a single meso-pore peak centered at about 200 Å, with a very small amount of surface area located within micro-pores (see Table II). As more silica is deposited, however, the surface area in the larger pores shrinks with an accompanying small shift to smaller diameter. Again, this indicates wall coating from the smaller oligomers, and some blockage of the larger ones, may be occurring. Unexpectedly, the micro-pore surface area increases significantly due to the silica deposition: from 14% to almost 50% of surface area of the silica-reinforced catalysts of Examples 2-5 is in the micro-pores (see Table II). The total BET surface areas of the silica-reinforced catalysts of Examples 2-5 are in the 400-413 m$^2$/g range.

Surprisingly, unlike its pore volume contribution, the new surface area found within the micro-pores (pores with pore diameters less than 50 Å) is additive and, therefore, it has a major effect on the total BET surface area. This explains why the total pore volume drops (see Table I and Table II), whereas the total surface remains almost constant, with silica addition. Also noteworthy is the fact that the decrease in meso-pore surface area with silica addition parallels the decrease in meso-pore pore volume.

Polymerization Experiments with Catalysts 1-5

Effect of Added Silica on Polymer Properties

The catalysts of Examples 1-5 were used in polymerization experiments conducted in a 2.65-L stainless-steel reactor equipped with a marine stirrer rotating at 500 rpm. The reactor was surrounded by a stainless-steel jacket through which was circulated a stream of hot water, which permitted precise temperature control to within +/−0.5° C., with the help of electronic control instruments. Unless otherwise stated, a small amount (typically 0.05 to 0.2 g) of the (activated) solid chromium supported catalyst was first charged under nitrogen into the dry reactor. Next, 1.2 L of isobutane liquid were added and the reactor was heated to desired polymerization temperature of 105° C. Then, ethylene was added to the reactor to reach 550 psig (3.79 MPa); no comonomer, hydrogen, or co-catalyst was used. Ethylene was fed on demand to maintain the reactor pressure of 550 psig. The reactor contents were stirred for the specified time, usually about one hour, and the polymerization rate was noted by recording the flow of ethylene into the reactor to maintain the set pressure. After the allotted time, the ethylene flow was stopped and the reactor slowly depressurized and opened to recover a granular polymer powder. Dry polymer powder was then removed and weighed. Activity was determined from this weight and the reaction time.

For the polymerization experiments, Table I summarizes the chromium supported catalyst used; the molecular weight, melt flow, and LCB properties of the ethylene polymer produced; and catalyst activities based on the weight of the final catalyst and on the weight of the original silica support (in kg PE/g/hr). As shown in Table I, the addition of silica to the catalyst reduced the catalyst activity. While not wishing to be bound by theory, it is believed that the reduced activity may be due to the added silica blocking pores, thus making those areas unavailable for the polymerization reaction.

Figure 3:
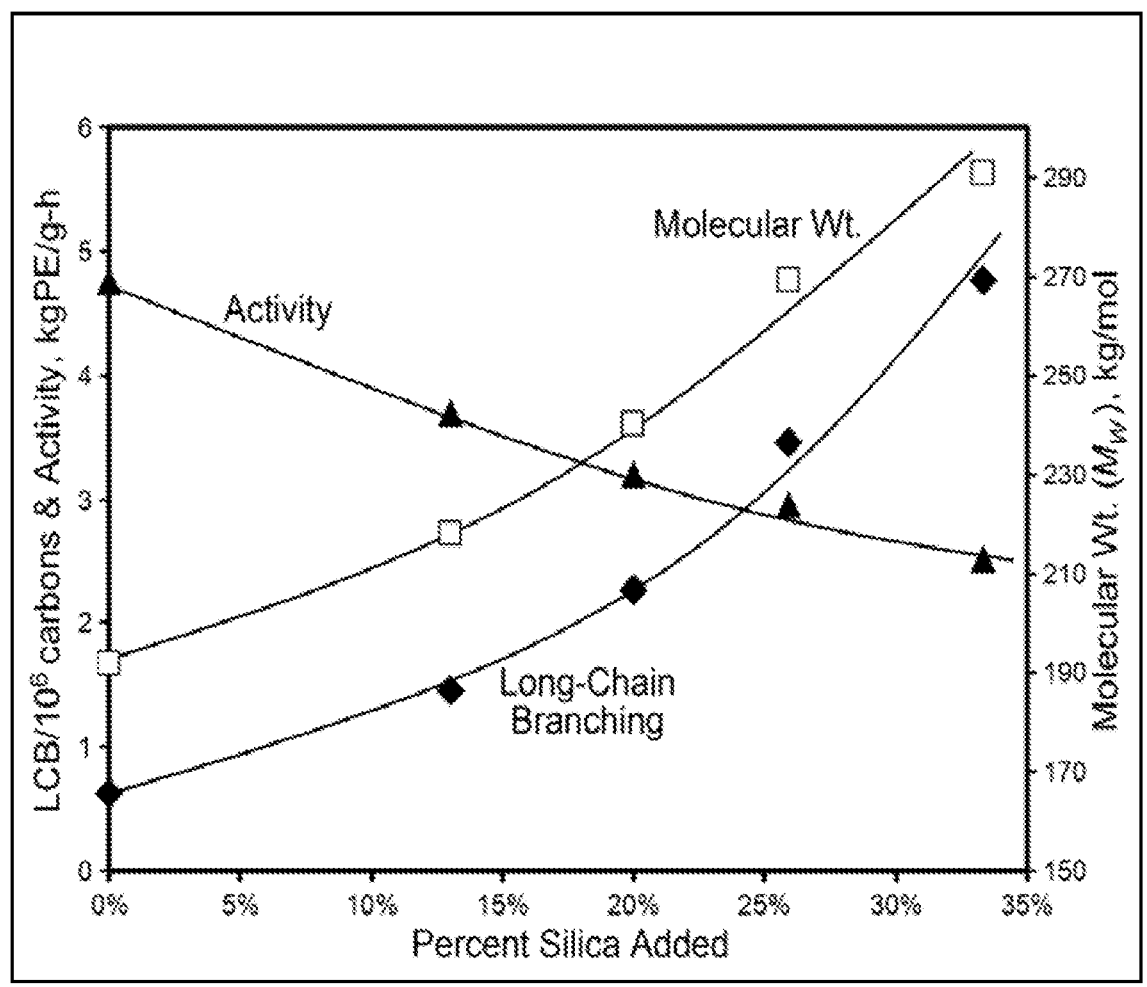
FIG. 3 presents a plot of catalyst activity for the catalysts of Examples 1-5 containing from zero to 33 wt. % added silica, and the long chain branch content and Mw of polymers produced from the catalysts of Examples 1-5 containing from zero to 33 wt. % added silica.
Figure 4:
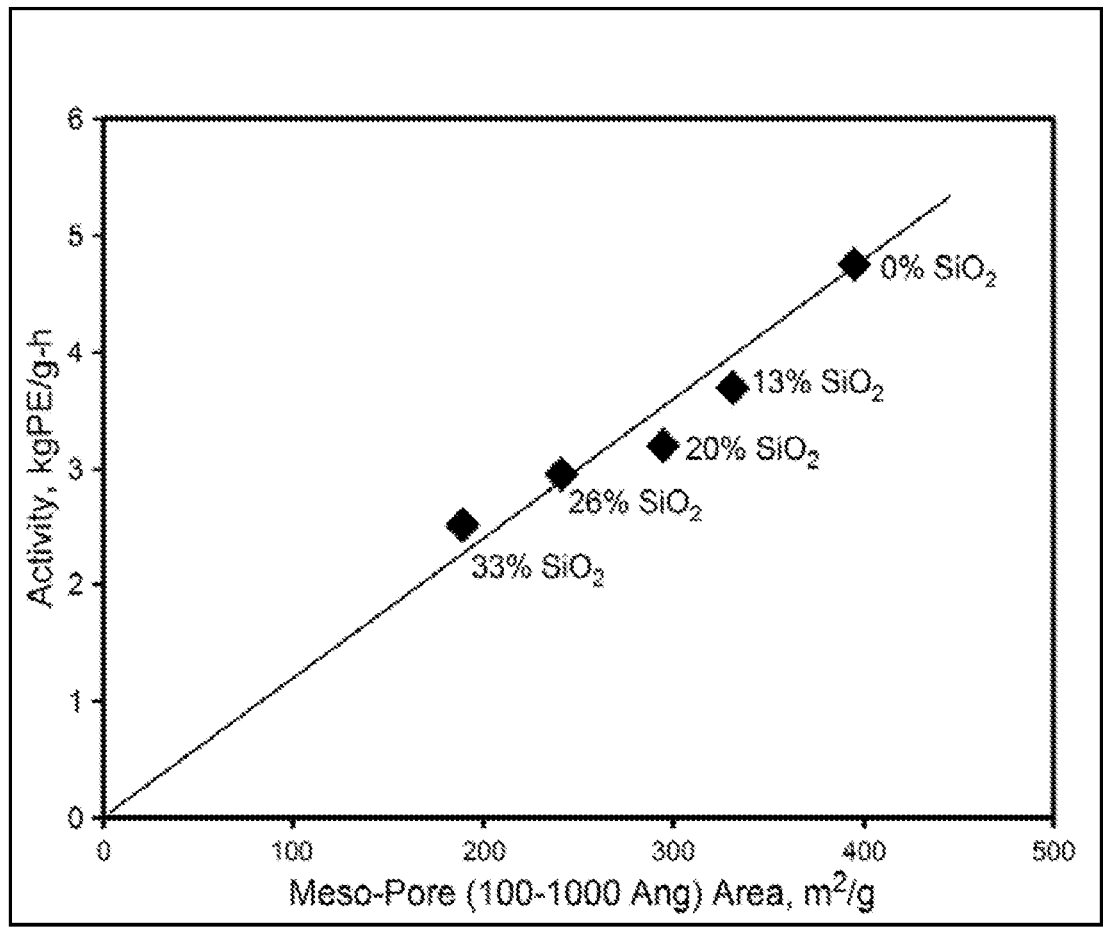
FIG. 4 presents a plot of catalyst activity as a function of meso-pore surface area for the catalysts of Examples 1-5 containing from zero to 33 wt. % added silica.

FIG. 3 illustrates the catalyst activity as a function of the amount of silica addition. The drop in activity is significant, but not catastrophic. That is, even the most extreme loading (33 wt. % silica added in Example 5) did not kill the catalyst, but it did lower the activity to about half of its original value. However, there is another way to view this activity response. FIG. 4 plots the catalyst activity as a function of the meso-pore surface area (surface area inside pores with diameters of 100-1000 Å), and it provides a straight line passing through the origin. In other words, the activity is proportional to the meso-pore surface area, indicating that the meso-pore surface area is the primary contributor to polymerization reactivity; the area inside the micro-pores does not seem to be a significant contributor to the overall activity.

The molecular weight properties of the polymers produced using the catalysts of Examples 1-5 are listed in Table I, and the respective Mw is plotted in FIG. 3 as a function of silica addition. Unexpectedly, Mn remained relatively constant, whereas Mw and Mz, both more sensitive to the longer chains and higher molecular weight species, increased dramatically. Adding silica to the catalyst increased the Mw and Mz. One theory for this result may be that the silica is reinforcing the meso-pores, which inhibits fragmentation, causing larger fragments and more polymer to be made inside pores. Another theory is that the increasing Mw and Mz reflects a polymer contribution from the micro-pores, which although contributing little to the overall catalyst activity, may still make a significant contribution to the high molecular weight fraction.

Figure 5:
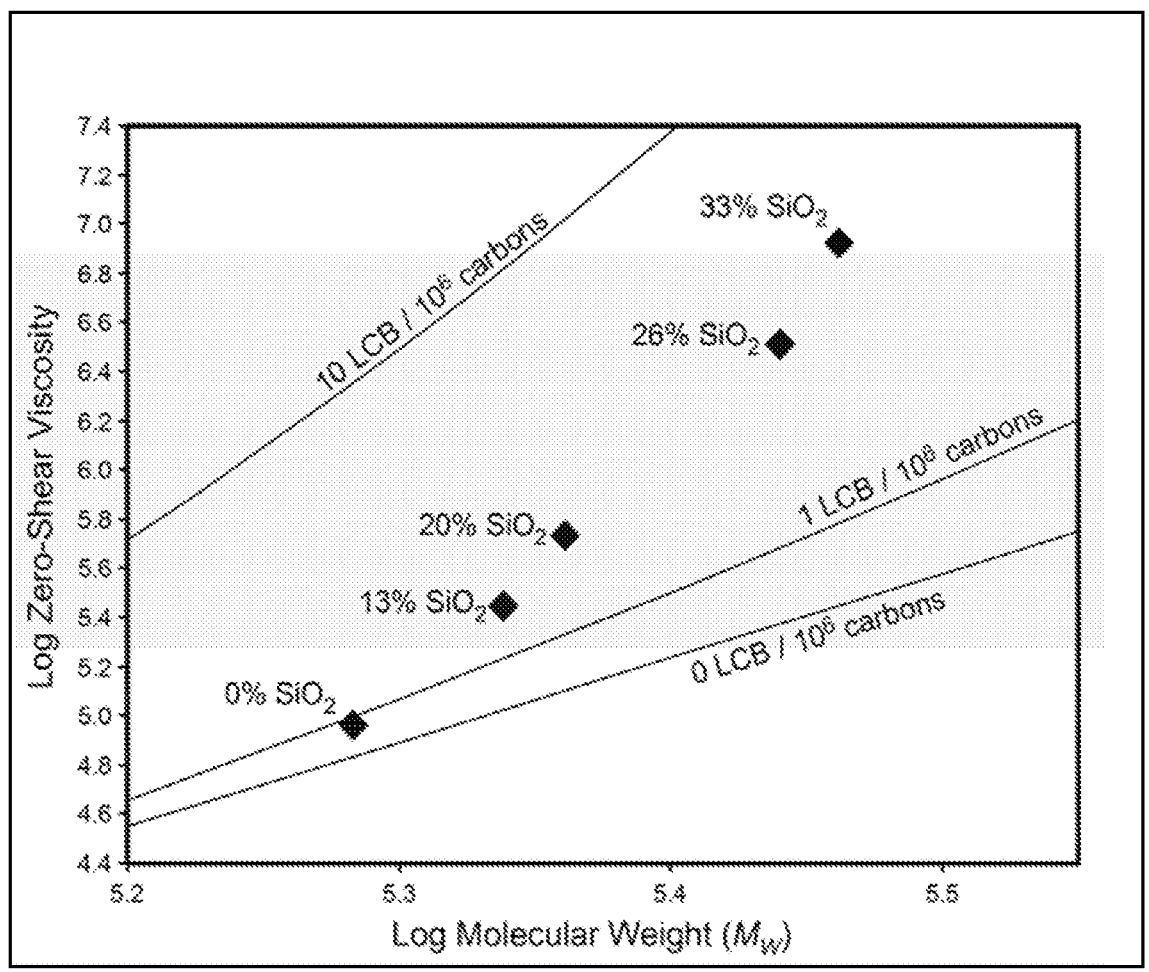
FIG. 5 presents a plot of the logarithm of zero-shear viscosity versus the logarithm of Mw for polymers produced from the catalysts of Examples 1-5 containing from zero to 33 wt. % added silica.

Table I also lists the MI, HLMI, ratio of HLMI/MI, and LCB content of the polymers produced using the catalysts of Examples 1-5. Unexpectedly, the addition of silica resulted in a dramatic reduction in both the MI and HLMI, and a dramatic increase in the LCB content (see also FIG. 3). The LCB contents were determined by using the Janzen-Colby rheological method, illustrated graphically in FIG. 5. The lower line, having a slope of 3.4, is the reference for linear polymers (0 LCB). The middle line shows the zero-shear viscosity expected for polymers having 1 LCB per million carbon atoms, and the top line shows it for polymers having 10 LCB per million carbons atoms. The data point for the polymer produced with a catalyst having no silica addition is below the 1 LCB line, but data points for the polymers produced with silica addition all fall between the 1 and 10 LCB reference lines, even though Mw is also increasing.

While not wishing to be bound by theory, the reason for the significant rise in LCB with silica deposition could relate back to one or both of the explanations mentioned above. First, the silica deposition may be reinforcing the catalyst structure, which makes the matrix more resistant to fragmentation. The resultant larger fragments could mean that more polymer is made inside pores, providing more long chain branching. Second, the surface area inside micro-pores also increases with silica loading, and could also be contributing a small amount of highly branched polymer, but not enough to significantly affect the overall catalytic activity.

Figure 6:
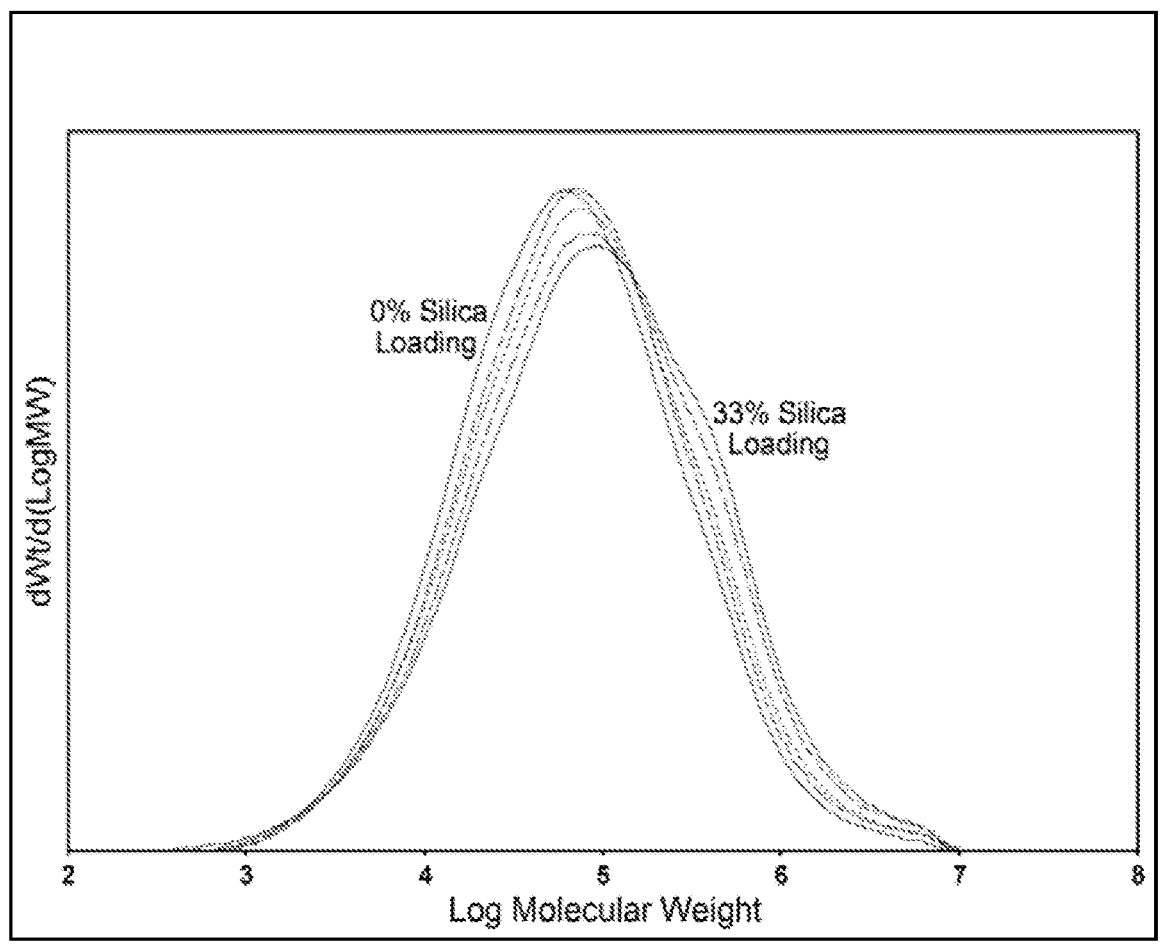
FIG. 6 presents a plot of the molecular weight distributions of polymers produced from the catalysts of Examples 1-5 containing from zero to 33 wt. % added silica.

The molecular weight distributions of the polymers produced using the catalysts of Examples 1-5 are illustrated in FIG. 6, and the ratio of Mw/Mn is listed in Table I. Instead of an overall shift of the whole MWD, a high molecular weight shoulder is unexpectedly added with increasing amounts of silica addition, resulting in higher values of Mw, Mz, and Mw/Mn. While not wishing to be bound by theory, the shoulder in FIG. 6 makes up a significant fraction of the total weight of the polymer, and likely may not be the result of micro-pores, due to the little contribution of micro-pores to the overall catalyst activity (see FIG. 4).

In sum, and regardless of any theory disclosed herein, depositing silica on a chromium supported catalyst, such as producing a silica-reinforced chromium/silica catalyst, can significantly impact numerous polymer properties: increase molecular weight (Mw and Mz), reduce melt flow (MI and HLMI), broaden the MWD (ratio of Mw/Mn), and increase long chain branching (LCB content per million total carbon atoms).

Constructive Examples

Alternative Preparation Methods for Silica-Reinforced Chromium/Silica Catalysts

While the silica-reinforced chromium/silica catalysts of Examples 1-5 were prepared by contacting silica with an alcohol-based solution of the silicate oligomers and the chromium-containing compound, other preparation methods can be used. For example, the silica, a silicon-containing material, and a chromium-containing compound can be combined while thermally treating (e.g., activating) to form the silica-reinforced chromium/silica catalyst. Alternatively, a silica-reinforced solid oxide (e.g., a silica-reinforced silica) can be combined with a chromium-containing compound in a suitable diluent to form the silica-reinforced chromium/silica catalyst. Alternatively, a silica-reinforced solid oxide (e.g., a silica-reinforced silica) can be combined with a chromium-containing compound while thermally treating (e.g., activating) to form the silica-reinforced chromium/silica catalyst. Alternatively, a chromium/silica catalyst (e.g., any suitable commercially-available grade) can be combined with the silicate oligomers in a suitable organic solvent to form the silica-reinforced chromium catalyst. Alternatively, a chromium/silica catalyst (e.g., any suitable commercially-available grade) can be combined with a silicon-containing material while thermally treating (e.g., activating) to form the silica-reinforced chromium/silica catalyst.

TABLE I

Catalyst and polymerization summary.

| Example | 1 | 2 | 3 | 4 | 5 |
|---|---|---|---|---|---|
| Silica added (wt. %) | 0 | 13 | 20 | 26 | 33 |
| SURFACE AREA (SA) - m$^2$/g | | | | | |
| Total SA | 440 | 413 | 400 | 401 | 400 |
| Expected SA if added silica is nonporous | 440 | 383 | 352 | 326 | 293 |
| SA of added silica | — | 233 | 240 | 290 | 320 |
| SA in pores 100-1000 Å | 395 | 331 | 295 | 241 | 189 |
| PORE VOLUME (PV) - mL/g | | | | | |
| Total PV | 2.73 | 2.20 | 1.87 | 1.49 | 1.21 |
| Expected PV if added silica is nonporous | 2.73 | 2.31 | 2.09 | 1.90 | 1.67 |
| PV of added silica | — | −0.88 | −1.12 | −1.60 | −1.38 |
| Average pore diameter (Å) | 248 | 213 | 187 | 149 | 121 |
| Activity of catalyst (kgPE/g-h) | 4.75 | 3.69 | 3.20 | 2.94 | 2.52 |
| Activity based on original silica | 4.75 | 4.25 | 4.00 | 3.97 | 3.78 |
| Long chain branches (LCB)/10$^6$ carbons | 0.63 | 1.46 | 2.26 | 3.60 | 4.71 |
| Mn (kg/mol) | 24 | 26 | 23 | 28 | 26 |
| Mw (kg/mol) | 192 | 218 | 240 | 276 | 290 |
| Mz (kg/mol) | 1296 | 1503 | 1585 | 1902 | 1999 |
| Polydispersity - Mw/Mn | 8.0 | 8.3 | 10.3 | 9.9 | 11.1 |
| Mz/Mw | 6.8 | 6.9 | 6.6 | 6.9 | 6.9 |
| MI - I$_2$, 2.16 kg (g/10 min) | 0.527 | 0.283 | 0.185 | 0.058 | 0.029 |
| HLMI - I$_{21}$, 21.6 kg (g/10 min) | 26.2 | 16.2 | 11.1 | 5.9 | 2.7 |
| HLMI/MI | 49.7 | 57.2 | 60.0 | 101.7 | 93.1 |

TABLE II

Catalyst micro-pore and meso-pore properties.

| Example | 1 | 2 | 3 | 4 | 5 |
|---|---|---|---|---|---|
| Silica added (wt. %) | 0 | 13 | 20 | 26 | 33 |
| SURFACE AREA (SA) - m$^2$/g | | | | | |
| Total SA | 440 | 413 | 400 | 401 | 400 |
| Meso-pore (100-1000 Å) SA | 395 | 331 | 295 | 241 | 189 |
| Micro-pore (<50 Å) SA | 21 | 58 | 86 | 143 | 196 |
| SA in micro-pores (%) | 5 | 14 | 21 | 36 | 49 |
| PORE VOLUME (PV) - mL/g | | | | | |
| Total PV | 2.73 | 2.20 | 1.87 | 1.49 | 1.21 |
| Meso-pore (100-1000 Å) PV | 2.65 | 2.11 | 1.78 | 1.38 | 1.07 |
| Micro-pore (<50 Å) PV | 0.01 | 0.02 | 0.04 | 0.07 | 0.10 |
| PV in micro-pores (%) | 0.3 | 1.1 | 1.9 | 4.5 | 8.1 |

The invention is described above with reference to numerous aspects and specific examples. Many variations will suggest themselves to those skilled in the art in light of the above detailed description. All such obvious variations are within the full intended scope of the appended claims. Other aspects of the invention can include, but are not limited to, the following (aspects are described as "comprising" but, alternatively, can "consist essentially of" or "consist of"):

Aspect 1. A (silica-reinforced or silica-deposited) chromium supported catalyst comprising:
a solid support; and
from about 0.1 to about 15 wt. % chromium, based on the total weight of the catalyst; wherein the catalyst is characterized by:
a total pore volume of at least about 0.8 mL/g;
a total BET surface area of at least about 200 m$^2$/g; and
a micropore BET surface area (<50 Å) that is from about 10% to about 60% of the total BET surface area.

Aspect 2. The catalyst defined in aspect 1, wherein the catalyst contains any suitable amount of chromium, or an amount in any range disclosed herein, e.g., from about 0.5 to about 15 wt. %, from about 0.5 to about 5 wt. %, from about 0.5 to about 2.5 wt. %, etc., based on the total weight of the catalyst.

Aspect 3. The catalyst defined in aspect 1 or 2, wherein the catalyst has a total pore volume in any suitable range, or any range disclosed herein, e.g., from about 0.8 to about 5 mL/g, from about 1 to about 5 mL/g, from about 1 to about 4 mL/g, from about 1.2 to about 3 mL/g, from about 1.5 to about 3.5 mL/g, etc.

Aspect 4. The catalyst defined in any one of aspects 1-3, wherein the catalyst has a total BET surface area in any suitable range, or any range disclosed herein, e.g., from about 200 to about 700 m$^2$/g, from about 250 to about 550 m$^2$/g, from about 275 to about 525 m$^2$/g, etc.

Aspect 5. The catalyst defined in any one of aspects 1-4, wherein the catalyst has a micropore BET surface area (<50 Å) that is any suitable percentage of the total BET surface area, or in any range disclosed herein, e.g., from about 10% to about 60%, from about 10% to about 50%, from about 15% to about 50%, from about 20% to about 60%, from about 20% to about 50%, etc.

Aspect 6. The catalyst defined in any one of aspects 1-5, wherein the catalyst has a micropore pore volume (<50 Å) that is any suitable percentage of the total pore volume, or in any range disclosed herein, e.g., from about 1% to about 20%, from about 1% to about 1%, from about 1.5% to about 12%, etc.

Aspect 7. The catalyst defined in any one of aspects 1-6, wherein at least about 75 wt. %, at least about 90 wt. %, at least about 95 wt. %, etc., of the chromium is present in an oxidation state of three or less.

Aspect 8. The catalyst defined in any one of aspects 1-7, wherein the catalyst has an average (d50) particle size in any suitable range, or any range disclosed herein, e.g., from about 10 to about 500 microns, from about 25 to about 250 microns, from about 40 to about 160 microns, etc.

Aspect 9. The catalyst defined in any one of aspects 1-8, wherein the catalyst contains less than or equal to about 5 wt. % carbon, less than or equal to about 3 wt. % carbon, less than or equal to about 1 wt. % carbon, etc.

Aspect 10. The catalyst defined in any one of aspects 1-9, wherein the catalyst contains any suitable amount of added silica, or an amount in any range disclosed herein, e.g., from about 10 to about 50 wt. %, from about 10 to about 40 wt. %, from about 10 to about 35 wt. %, etc., based on the weight of added silica ($SiO_2$) to the total weight of the reinforced catalyst.

Aspect 11. The catalyst defined in any one of aspects 1-10, wherein the solid support comprises any suitable silica-containing solid oxide, or any silica-containing solid oxide disclosed herein, e.g., silica, silica-alumina, silica-titania, silica-zirconia, silica-titania-magnesia, etc., or any combination thereof.

Aspect 12. The catalyst defined in any one of aspects 1-10, wherein the solid support is silica, silica-alumina, silica-titania, or silica-zirconia.

Aspect 13. The catalyst defined in any one of aspects 1-10, wherein the solid support is silica.

Aspect 14. The catalyst defined in any one of aspects 1-10, wherein the chromium supported catalyst comprises chromium/silica, chromium/silica-titania, chromium/silica-titania-magnesia, chromium/silica-alumina, etc., or any combination thereof.

Aspect 15. The catalyst defined in any one of aspects 1-10, wherein the chromium supported catalyst comprises chromium/silica.

Aspect 16. A (silica-reinforced or silica-deposited) solid support comprising:

a solid oxide; wherein the solid support is characterized by:

a total pore volume of at least about 0.8 mL/g;

a total BET surface area of at least about 200 $m^2/g$; and a micropore BET surface area (<50 Å) that is from about 10% to about 60% of the total BET surface area.

Aspect 17. The solid support defined in aspect 16, wherein the solid support has a total pore volume in any suitable range, or any range disclosed herein, e.g., from about 0.8 to about 5 mL/g, from about 1 to about 5 mL/g, from about 1 to about 4 mL/g, from about 1.2 to about 3 mL/g, from about 1.5 to about 3.5 mL/g, etc.

Aspect 18. The solid support defined in aspect 16 or 17, wherein the solid support has a total BET surface area in any suitable range, or any range disclosed herein, e.g., from about 200 to about 700 $m^2/g$, from about 250 to about 550 $m^2/g$, from about 275 to about 525 $m^2/g$, etc.

Aspect 19. The solid support defined in any one of aspects 16-18, wherein the solid support has a micropore BET surface area (<50 Å) that is any suitable percentage of the total BET surface area, or in any range disclosed herein, e.g., from about 10% to about 60%, from about 10% to about 50%, from about 15% to about 50%, from about 20% to about 60%, from about 20% to about 50%, etc.

Aspect 20. The solid support defined in any one of aspects 16-19, wherein the solid support has a micropore pore volume (<50 Å) that is any suitable percentage of the total pore volume, or in any range disclosed herein, e.g., from about 1% to about 20%, from about 1% to about 1%, from about 1.5% to about 12%, etc.

Aspect 21. The solid support defined in any one of aspects 16-20, wherein the solid support has an average (d50) particle size in any suitable range, or any range disclosed herein, e.g., from about 10 to about 500 microns, from about 25 to about 250 microns, from about 40 to about 160 microns, etc.

Aspect 22. The solid support defined in any one of aspects 16-21, wherein the solid support contains less than or equal to about 5 wt. % carbon, less than or equal to about 3 wt. % carbon, less than or equal to about 1 wt. % carbon, etc.

Aspect 23. The solid support defined in any one of aspects 16-22, wherein the solid support contains any suitable amount of added silica, or an amount in any range disclosed herein, e.g., from about 10 to about 50 wt. %, from about 10 to about 40 wt. %, from about 10 to about 35 wt. %, etc., based on the weight of added silica ($SiO_2$) to the total weight of the reinforced solid support.

Aspect 24. The solid support defined in any one of aspects 16-23, wherein the solid oxide comprises any suitable silica-containing solid oxide, or any silica-containing solid oxide disclosed herein, e.g., silica, silica-alumina, silica-titania, silica-zirconia, etc., or any combination thereof.

Aspect 25. The solid support defined in any one of aspects 16-23, wherein the solid oxide is silica, silica-alumina, silica-titania, or silica-zirconia.

Aspect 26. The solid support defined in any one of aspects 16-23, wherein the solid oxide is silica.

Aspect 27. A process for reinforcing a solid support, the process comprising: contacting a solid oxide with a silicon-containing material to deposit at least about 5 wt. % silica on the solid oxide to form a silica-reinforced solid support (the amount of added silica is based on the weight of added silica ($SiO_2$) to the total weight of the silica-reinforced solid support).

Aspect 28. The process defined in aspect 27, wherein the solid oxide comprises any suitable silica-containing solid oxide, or any silica-containing solid oxide disclosed herein, e.g., silica, silica-alumina, silica-titania, silica-zirconia, etc., or any combination thereof.

Aspect 29. The process defined in aspect 27, wherein the solid oxide is silica, silica-alumina, silica-titania, or silica-zirconia.

Aspect 30. The process defined in aspect 27, wherein the solid oxide is silica.

Aspect 31. The process defined in aspect 27, wherein the solid oxide comprises a zeolite.

Aspect 32. The process defined in any one of aspects 27-31, wherein the amount of silica deposited on the solid oxide is any suitable amount, or an amount in any range disclosed herein, e.g., from about 5 to about 50 wt. %, from about 10 to about 50 wt. %, from about 10 to about 40 wt. %, from about 10 to about 35 wt. %, etc., based on the weight of added silica ($SiO_2$) to the total weight of the silica-reinforced solid support.

Aspect 33. The process defined in any one of aspects 27-32, wherein the silicon-containing material comprises any suitable silicon compound, or any silicon compound disclosed herein, e.g., a silicon alkoxide (e.g., tetraethyl orthosilicate), a silicon halide, a silicon hydride, a silane, a hydrocarbyl silane, a siloxane, etc., or any combination thereof.

Aspect 34. The process defined in any one of aspects 27-32, wherein the silicon-containing material comprises any suitable silicate oligomer, or any silicate oligomer disclosed herein, e.g., a tetraethyl orthosilicate oligomer.

Aspect 35. The process defined in aspect 34, wherein the silicate oligomer is characterized by any suitable Mn, or a Mn in any range disclosed herein, e.g., from about 100 to about 2000 g/mol, from about 250 to about 2000 g/mol, from about 500 to about 1200 g/mol, etc.

Aspect 36. The process defined in aspect 34 or 35, wherein the silicate oligomer is produced by any suitable process, or any process disclosed herein, e.g., contacting any suitable silicon compound with water (any suitable amount)

and an acid or a base in any suitable solvent to form a solution containing the silicate oligomer.

Aspect 37. The process defined in aspect 36, wherein the silicon compound comprises any suitable silicon compound, or any silicon compound disclosed herein, e.g., a silicon alkoxide (e.g., tetraethyl orthosilicate), a silicon halide, a silicon hydride, a silane, a hydrocarbyl silane, a siloxane, etc., or any combination thereof.

Aspect 38. The process defined in any one of aspects 27-37, further comprising a step of drying the silica-reinforced solid support.

Aspect 39. The process defined in aspect 38, wherein drying comprises spray drying.

Aspect 40. The process defined in any one of aspects 27-39, further comprising a step of thermally treating (e.g., calcining) after the contacting step and/or drying step.

Aspect 41. The process defined in any one of aspects 27-37, wherein the step of contacting comprises combining (mixing or slurrying or impregnating) the solid oxide and the silicon-containing material while thermally treating (e.g., calcining) to form the silica-reinforced solid support.

Aspect 42. A silica-reinforced solid support prepared by the process defined in any one of aspects 27-41.

Aspect 43. A silica-reinforced solid support prepared by the process defined in any one of aspects 27-41, wherein the solid support is defined in any one of aspects 16-26.

Aspect 44. The process defined in any one of aspects 27-37, wherein the step of contacting comprises combining (mixing or slurrying or impregnating) (in any order) the solid oxide, the silicon-containing material, and a chromium-containing compound, to form a silica-reinforced chromium supported catalyst.

Aspect 45. The process defined in aspect 44, further comprising a step of drying the silica-reinforced chromium supported catalyst.

Aspect 46. The process defined in aspect 44 or 45, further comprising a step of thermally treating (e.g., calcining or activating) after the contacting step and/or drying step.

Aspect 47. The process defined in aspect 41, wherein the step of contacting comprises combining (mixing or slurrying or impregnating) the solid oxide, the silicon-containing material, and a chromium-containing compound while thermally treating (e.g., calcining or activating) to form a silica-reinforced chromium supported catalyst.

Aspect 48. A process comprising combining the silica-reinforced solid support defined in aspect 42 or 43 and a chromium-containing compound in a diluent, and drying to form a silica-reinforced chromium supported catalyst.

Aspect 49. The process defined in aspect 48, further comprising a step of thermally treating (e.g., calcining or activating) after the drying step.

Aspect 50. A process comprising combining the silica-reinforced solid support defined in aspect 42 or 43 and a chromium-containing compound while thermally treating (e.g., calcining or activating) to form a silica-reinforced chromium supported catalyst.

Aspect 51. The process defined in any one of aspects 44-50, wherein the chromium-containing compound comprises any suitable chromium compound, or any chromium compound disclosed herein, e.g., chromium (II) acetate, chromium (II) chloride, chromium (II) bromide, chromium (II) iodide, chromium (II) sulfate, chromium (III) acetate, chromium (III) acetylacetonate, chromium (III) chloride, chromium (III) bromide, chromium (III) sulfate, chromium (III) nitrate, tertiary butyl chromate, a diarene chromium (0) compound, bis-cyclopentadienyl chromium (II), chromium trioxide, etc., or any combination thereof.

Aspect 52. A silica-reinforced chromium supported catalyst produced by the process defined in any one of aspects 44-51.

Aspect 53. A silica-reinforced chromium supported catalyst produced by the process defined in any one of aspects 44-51, wherein the catalyst is defined in any one of aspects 1-15.

Aspect 54. A process for reinforcing a chromium supported catalyst, the process comprising:

contacting a chromium supported catalyst with a silicon-containing material to deposit at least about 5 wt. % silica on the chromium supported catalyst to form a silica-reinforced chromium supported catalyst (the amount of added silica is based on the weight of added silica ($SiO_2$) to the total weight of the silica-reinforced chromium supported catalyst).

Aspect 55. The process defined in aspect 54, wherein the chromium supported catalyst comprises chromium/silica, chromium/silica-titania, chromium/silica-titania-magnesia, chromium/silica-alumina, etc., or any combination thereof.

Aspect 56. The process defined in aspect 54, wherein the chromium supported catalyst comprises chromium/silica.

Aspect 57. The process defined in any one of aspects 54-56, wherein the amount of silica deposited on the chromium supported catalyst is any suitable amount or an amount in any range disclosed herein, e.g., from about 5 to about 50 wt. %, from about 10 to about 50 wt. %, from about 10 to about 40 wt. %, from about 10 to about 35 wt. %, etc., based on the weight of the weight of added silica ($SiO_2$) to the total weight of the silica-reinforced chromium supported catalyst.

Aspect 58. The process defined in any one of aspects 54-57, wherein the silicon-containing material comprises any suitable silicon compound, or any silicon compound disclosed herein, e.g., a silicon alkoxide (e.g., tetraethyl orthosilicate), a silicon halide, a silicon hydride, a silane, a hydrocarbyl silane, a siloxane, etc., or any combination thereof.

Aspect 59. The process defined in any one of aspects 54-57, wherein the silicon-containing material comprises any suitable silicate oligomer, or any silicate oligomer disclosed herein, e.g., a tetraethyl orthosilicate oligomer.

Aspect 60. The process defined in aspect 59, wherein the silicate oligomer is characterized by any suitable Mn, or a Mn in any range disclosed herein, e.g., from about 100 to about 2000 g/mol, from about 250 to about 2000 g/mol, from about 500 to about 1200 g/mol, etc.

Aspect 61. The process defined in aspect 59 or 60, wherein the silicate oligomer is produced by any suitable process, or any process disclosed herein, e.g., contacting any suitable silicon compound with water (any suitable amount) and an acid or a base in any suitable solvent to form a solution containing the silicate oligomer.

Aspect 62. The process defined in aspect 61, wherein the silicon compound comprises any suitable silicon compound, or any silicon compound disclosed herein, e.g., a silicon alkoxide (e.g., tetraethyl orthosilicate), a silicon halide, a silicon hydride, a silane, a hydrocarbyl silane, a siloxane, etc., or any combination thereof.

Aspect 63. The process defined in any one of aspects 54-62, further comprising a step of drying the silica-reinforced chromium supported catalyst.

Aspect 64. The process defined in aspect 63, wherein drying comprises spray drying.

Aspect 65. The process defined in any one of aspects 54-64, further comprising a step of thermally treating (e.g., activating) after the contacting step and/or drying step.

Aspect 66. The process defined in any one of aspects 54-62, wherein the step of contacting comprises combining (mixing or slurrying or impregnating) the chromium supported catalyst and the silicon-containing material while thermally treating (e.g., activating) to form the silica-reinforced chromium supported catalyst.

Aspect 67. A silica-reinforced chromium supported catalyst produced by the process defined in any one of aspects 54-66.

Aspect 68. A silica-reinforced chromium supported catalyst produced by the process defined in any one of aspects 54-66, wherein the catalyst is defined in any one of aspects 1-15.

Aspect 69. An olefin polymerization process, the process comprising contacting the (activated) silica-reinforced chromium supported catalyst defined in any one of aspects 1-15, 52-53, or 67-68 and an optional co-catalyst with an olefin monomer and an optional olefin comonomer in a polymerization reactor system under polymerization conditions to produce an olefin polymer.

Aspect 70. The olefin polymerization process defined in aspect 69, wherein a co-catalyst is used, and the co-catalyst comprises any suitable co-catalyst, or any co-catalyst disclosed herein, e.g., an aluminoxane co-catalyst, an organoaluminum co-catalyst, an organoboron co-catalyst, etc., or any combination thereof.

Aspect 71. The olefin polymerization process defined in aspect 69 or 70, wherein the olefin monomer comprises any olefin monomer disclosed herein, e.g., any $C_2$-$C_{20}$ olefin.

Aspect 72. The olefin polymerization process defined in any one of aspects 69-71, wherein the olefin monomer and the optional olefin comonomer independently comprise a $C_2$-$C_{20}$ alpha-olefin.

Aspect 73. The olefin polymerization process defined in any one of aspects 69-71, wherein the olefin monomer comprises ethylene.

Aspect 74. The olefin polymerization process defined in any one of aspects 69-73, wherein the catalyst is contacted with ethylene and an olefin comonomer comprising a $C_3$-$C_{10}$ alpha-olefin.

Aspect 75. The olefin polymerization process defined in any one of aspects 69-74, wherein the catalyst is contacted with ethylene and an olefin comonomer comprising 1-butene, 1-hexene, 1-octene, or a mixture thereof.

Aspect 76. The olefin polymerization process defined in any one of aspects 69-72, wherein the olefin monomer comprises propylene.

Aspect 77. The olefin polymerization process defined in any one of aspects 69-76, wherein the polymerization reactor system comprises a batch reactor, a slurry reactor, a gas-phase reactor, a solution reactor, a high pressure reactor, a tubular reactor, an autoclave reactor, or a combination thereof.

Aspect 78. The olefin polymerization process defined in any one of aspects 69-77, wherein the polymerization reactor system comprises a slurry reactor, a gas-phase reactor, a solution reactor, or a combination thereof.

Aspect 79. The olefin polymerization process defined in any one of aspects 69-78, wherein the polymerization reactor system comprises a loop slurry reactor.

Aspect 80. The olefin polymerization process defined in any one of aspects 69-79, wherein the polymerization reactor system comprises a single reactor.

Aspect 81. The olefin polymerization process defined in any one of aspects 69-79, wherein the polymerization reactor system comprises 2 reactors.

Aspect 82. The olefin polymerization process defined in any one of aspects 69-79, wherein the polymerization reactor system comprises more than 2 reactors.

Aspect 83. The olefin polymerization process defined in any one of aspects 69-82, wherein the olefin polymer comprises any olefin polymer disclosed herein.

Aspect 84. The olefin polymerization process defined in any one of aspects 69-75 or 77-83, wherein the olefin polymer comprises an ethylene homopolymer, an ethylene/1-butene copolymer, an ethylene/1-hexene copolymer, and/or an ethylene/1-octene copolymer.

Aspect 85. The olefin polymerization process defined in any one of aspects 69-72 and 76-83, wherein the olefin polymer comprises a polypropylene homopolymer and/or a propylene-based copolymer.

Aspect 86. The olefin polymerization process defined in any one of aspects 69-85, wherein the polymerization conditions comprise a polymerization reaction temperature in a range from about 60° C. to about 120° C. and a reaction pressure in a range from about 200 to about 1000 psig (about 1.4 to about 6.9 MPa).

Aspect 87. The olefin polymerization process defined in any one of aspects 69-86, wherein the polymerization conditions are substantially constant, e.g., for a particular polymer grade.

Aspect 88. The olefin polymerization process defined in any one of aspects 69-87, wherein no hydrogen is added to the polymerization reactor system.

Aspect 89. The olefin polymerization process defined in any one of aspects 69-87, wherein hydrogen is added to the polymerization reactor system.

Aspect 90. The olefin polymerization process defined in any one of aspects 69-89, wherein the olefin polymer has a density in any range disclosed herein, e.g., from about 0.90 to about 0.97, from about 0.92 to about 0.96, from about 0.93 to about 0.955, from about 0.94 to about 0.955 g/cm$^3$, etc.

Aspect 91. The olefin polymerization process defined in any one of aspects 69-90, wherein the olefin polymer has a Mw in any range disclosed herein, e.g., from about 100 to about 500 kg/mol, from about 150 to about 350 kg/mol, from about 200 to about 320 kg/mol, etc.

Aspect 92. The olefin polymerization process defined in any one of aspects 69-91, wherein the olefin polymer has a ratio of Mw/Mn in any range disclosed herein, e.g., from about 5 to about 40, from about 7 to about 25, from about 8 to about 15, etc.

Aspect 93. The olefin polymerization process defined in any one of aspects 69-92, wherein the olefin polymer has a HLMI in any range disclosed herein, e.g., from about 1 to about 80, from about 2 to about 40, from about 2 to about 30, from about 1 to about 20 g/10 min, etc.

Aspect 94. The olefin polymerization process defined in any one of aspects 69-93, wherein the olefin polymer has an amount of LCB in any range disclosed herein, e.g., from about 1 to about 10, from about 1 to about 5, etc., LCB per million total carbon atoms.

Aspect 95. An olefin polymer produced by the olefin polymerization process defined in any one of aspects 69-94.

Aspect 96. An article of manufacture comprising the polymer defined in aspect 95.

Aspect 97. The article defined in aspect 96, wherein the article is an agricultural film, an automobile part, a bottle, a drum, a fiber or fabric, a food packaging film or container, a food service article, a fuel tank, a geomembrane, a household container, a liner, a molded product, a medical device or material, a pipe, a sheet or tape, or a toy.

We claim:

1. An ethylene polymer having:
   a melt index in a range from greater than 0 to about 0.5 g/10 min;
   a ratio of HLMI/MI in a range from about 30 to about 150;
   a Mw in a range from about 150 to about 350 kg/mol;
   a Mz in a range from about 1000 to about 2500 kg/mol;
   a ratio of Mw/Mn in a range from about 5 to about 15;
   a ratio of Mz/Mw in a range from about 5 to about 9; and
   from about 2 to about 10 LCB per million total carbon atoms.

2. The polymer of claim 1, wherein:
   the melt index is in a range from greater than 0 to about 0.2 g/10 min;
   the ratio of HLMI/MI is in a range from about 45 to about 120;
   the Mw is in a range from about 200 to about 300 kg/mol; and
   the ratio of Mw/Mn is in a range from about 7 to about 12.

3. The polymer of claim 2, wherein the ethylene polymer has:
   from about 2 to about 8 LCB per million total carbon atoms; and
   a density in a range from about 0.92 to about 0.96 g/cm$^3$.

4. The polymer of claim 1, wherein the ratio of Mz/Mw is in a range from about 6 to about 8.

5. The polymer of claim 1, wherein the ethylene polymer is further characterized by a HLMI in a range from about 1 to about 20 g/10 min.

6. The polymer of claim 3, wherein:
   the Mz is in a range from about 1400 to about 2200 kg/mol;
   the ratio of Mz/Mw is in a range from about 6 to about 8;
   the ethylene polymer contains chromium; and
   the ethylene polymer comprises an ethylene homopolymer, an ethylene/1-butene copolymer, an ethylene/1-hexene copolymer, an ethylene/1-octene copolymer, or any combination thereof.

7. An article of manufacture comprising the ethylene polymer of claim 6.

8. An ethylene polymer having:
   a HLMI in a range from 1 to about 20 g/10 min;
   a ratio of HLMI/MI in a range from about 30 to about 150;
   a Mw in a range from about 200 to about 320 kg/mol;
   a ratio of Mw/Mn in a range from about 7 to about 12; and
   a ratio of Mz/Mw in a range from about 6 to about 8.

9. The polymer of claim 8, wherein the ethylene polymer has from about 1 to about 5 LCB per million total carbon atoms.

10. The polymer of claim 8, wherein the ethylene polymer has a density in a range from about 0.92 to about 0.96 g/cm$^3$.

11. The polymer of claim 10, wherein:
    the ratio of Mw/Mn is in a range from about 8 to about 12; and
    the ratio of Mz/Mw is in a range from about 6 to about 7.5.

12. The polymer of claim 8, wherein:
    the ratio of HLMI/MI is in a range from about 40 to about 120;
    the Mw is in a range from about 200 to about 300 kg/mol; and
    the ethylene polymer comprises an ethylene homopolymer, an ethylene/1-butene copolymer, an ethylene/1-hexene copolymer, an ethylene/1-octene copolymer, or any combination thereof.

13. An article of manufacture comprising the ethylene polymer of claim 12.

14. The polymer of claim 12, wherein the ethylene polymer contains chromium.

15. The polymer of claim 14, wherein the ethylene polymer has from about 1 to about 5 LCB per million total carbon atoms.

16. An ethylene polymer having:
    a melt index in a range from greater than 0 to about 0.5 g/10 min;
    a ratio of HLMI/MI in a range from about 30 to about 150;
    a Mw in a range from about 150 to about 350 kg/mol;
    a Mz in a range from about 1000 to about 2500 kg/mol;
    a ratio of Mw/Mn in a range from about 5 to about 15;
    a ratio of Mz/Mw in a range from about 5 to about 10; and
    from about 1 to about 8 LCB per million total carbon atoms.

17. The polymer of claim 16, wherein the ethylene polymer has from about 2 to about 5 LCB per million total carbon atoms.

18. The polymer of claim 16, wherein the ethylene polymer has a density in a range from about 0.92 to about 0.96 g/cm$^3$.

19. The polymer of claim 16, wherein the ratio of Mw/Mn is in a range from about 7 to about 12.

20. The polymer of claim 19, wherein:
    the Mz is in a range from about 1400 to about 2500 kg/mol;
    the ratio of Mz/Mw is in a range from about 5 to about 8;
    the ethylene polymer contains chromium; and
    the ethylene polymer has a density in a range from about 0.92 to about 0.96 g/cm$^3$.

21. The polymer of claim 20, wherein:
    the ratio of HLMI/MI is in a range from about 50 to about 150;
    the Mw is in a range from about 200 to about 300 kg/mol; and
    the ethylene polymer comprises an ethylene homopolymer, an ethylene/1-butene copolymer, an ethylene/1-hexene copolymer, an ethylene/1-octene copolymer, or any combination thereof.

22. An article of manufacture comprising the ethylene polymer of claim 21.

* * * * *